US011467977B2

(12) United States Patent
Yuan et al.

(10) Patent No.: US 11,467,977 B2
(45) Date of Patent: Oct. 11, 2022

(54) METHOD AND APPARATUS FOR MONITORING MEMORY ACCESS BEHAVIOR OF SAMPLE PROCESS

(71) Applicant: Huawei Technologies Co., Ltd., Shenzhen (CN)

(72) Inventors: Jinfeng Yuan, Shenzhen (CN); Jia Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/128,751

(22) Filed: Dec. 21, 2020

(65) Prior Publication Data
US 2021/0109864 A1 Apr. 15, 2021

Related U.S. Application Data

(63) Continuation of application No. PCT/CN2019/105034, filed on Sep. 10, 2019.

(30) Foreign Application Priority Data

Sep. 19, 2018 (CN) .......................... 201811092711.0

(51) Int. Cl.
*G06F 12/10* (2016.01)
*G06F 12/14* (2006.01)
(Continued)

(52) U.S. Cl.
CPC ...... *G06F 12/1009* (2013.01); *G06F 12/1054* (2013.01); *G06F 12/1063* (2013.01);
(Continued)

(58) Field of Classification Search
CPC .......... G06F 12/10; G06F 12/14; G06F 9/455; G06F 2009/455; G06F 12/1009;
(Continued)

(56) References Cited

U.S. PATENT DOCUMENTS 4,330,822 A * 5/1982 Dodson ..................... G06F 8/41
717/162
10,002,084 B1 * 6/2018 Warkentin .......... G06F 12/1027
(Continued)

FOREIGN PATENT DOCUMENTS

CN 102736969 A 10/2012
CN 103914363 A 7/2014
(Continued)

OTHER PUBLICATIONS

HSPT: Practical Implementation and Efficient Management of Embedded Shadow Page Tables for Cross-ISA System Virtual Machines by Wang (Year: 2014).*
(Continued)

*Primary Examiner* — Paul M Knight
(74) *Attorney, Agent, or Firm* — Slater Matsil, LLP

(57) ABSTRACT

A method for monitoring memory access behavior of a sample process is provided. A processing unit of a computer device determines a page table of the sample process based on a page directory base address of the sample process, where each entry of the page table includes first information, the first information indicates whether the entry has been assigned a guest physical address, the entry that has been assigned the guest physical address includes second information that is used to indicate an access permission of the assigned guest physical address; determines a target entry from the page table, the target entry has been assigned a guest physical address, and an access permission is execution allowed; determines a target host physical address corresponding to the target guest physical address that is assigned to the target entry; and monitors behavior of accessing memory space indicated by the target host physical address.

20 Claims, 9 Drawing Sheets

(51) Int. Cl.
*G06F 12/1009* (2016.01)
*G06F 12/1045* (2016.01)
*G06F 13/16* (2006.01)

(52) U.S. Cl.
CPC ...... *G06F 12/1458* (2013.01); *G06F 13/1668* (2013.01); *G06F 2212/151* (2013.01); *G06F 2212/7201* (2013.01)

(58) Field of Classification Search
CPC ............ G06F 12/1054; G06F 12/1063; G06F 12/1458; G06F 13/1668; G06F 2212/7201; G06F 2212/151
See application file for complete search history.

(56) References Cited

U.S. PATENT DOCUMENTS

| | | | |
|---|---|---|---|
| 10,447,728 B1* | 10/2019 | Steinberg | H04L 63/20 |
| 2004/0143720 A1* | 7/2004 | Mansell | G06F 12/1491 |
| | | | 711/206 |
| 2006/0075236 A1* | 4/2006 | Marek | H04L 9/0894 |
| | | | 713/171 |
| 2007/0214340 A1 | 9/2007 | Leveille et al. | |
| 2011/0082962 A1 | 4/2011 | Horovitz et al. | |
| 2012/0079164 A1* | 3/2012 | Hakewill | G06F 12/1009 |
| | | | 711/6 |
| 2012/0255015 A1* | 10/2012 | Sahita | G06F 21/54 |
| | | | 726/24 |
| 2014/0082261 A1* | 3/2014 | Cohen | G06F 3/0688 |
| | | | 711/103 |
| 2014/0325123 A1* | 10/2014 | Higeta | G06F 12/0246 |
| | | | 711/103 |
| 2015/0379263 A1 | 12/2015 | Vipat et al. | |
| 2016/0224383 A1 | 8/2016 | Bonzini et al. | |
| 2017/0286302 A1 | 10/2017 | Roy et al. | |

FOREIGN PATENT DOCUMENTS

| | | |
|---|---|---|
| CN | 104520823 A | 4/2015 |
| CN | 104751050 A | 7/2015 |
| WO | 2015131403 A1 | 9/2015 |

OTHER PUBLICATIONS

Inside Microsoft Windows 2000, Third Edition (Microsoft Programming Series) by Solomon (Year: 2000).*
CS61C Fall 2014 Lecture Notes; UC Berkley (Year: 2014).*
HSPT: Practical Implementation and Efficient Management of Embedded Shadow Page Tables forCross-ISA System Virtual Machines by Wang 2015 (Year: 2015).*

* cited by examiner

METHOD AND APPARATUS FOR MONITORING MEMORY ACCESS BEHAVIOR OF SAMPLE PROCESS

CROSS-REFERENCE TO RELATED APPLICATIONS

This application is a continuation of International Application No. PCT/CN2019/105034, filed on Sep. 10, 2019, which claims priority to Chinese Patent Application No. 201811092711.0, filed on Sep. 19, 2018. The disclosures of the aforementioned applications are hereby incorporated by reference in their entireties.

TECHNICAL FIELD

This application relates to the computer field, and more specifically, to a method and an apparatus for monitoring memory access behavior of a sample process.

BACKGROUND

As computer technologies develop, computer security has become the focus of people's attention. Monitoring memory access behavior of sample programs is a feasible means to discover potential malware and improve computer security.

Currently, in a technology, memory access behavior of a sample process is monitored according to the following principle: Program monitoring code is written into a sample program, a process that needs to be monitored is generated after the sample program runs, and then control point invoking code is added to memory space. When the control point code indicates that the memory space is accessed, the process jumps to the program monitoring code to monitor and record the memory access behavior of the sample program.

However, in existing operating systems such as the Windows operating system, there are many scenarios in which code is newly added to programs, such as loading new third-party dynamic link library (DLL) files, remote application for memory, and DLL injection.

In the foregoing scenarios, it is impossible to add a control point to the newly added code in a timely manner. Consequently, behavior of accessing or invoking the newly added code cannot be monitored, severely affecting computer security.

SUMMARY

This application provides a method and an apparatus for monitoring memory access behavior of a sample process, so as to improve computer security.

According to a first aspect, a method for monitoring memory access behavior of a sample process is provided. The method includes: a processing unit determines a page table of the sample process based on a page directory base address of the sample process, where the sample process is a process generated after a monitored sample program runs, the page table of the sample process includes a plurality of entries, the plurality of entries are in one-to-one correspondence to a plurality of guest virtual addresses, each entry includes first information, the first information indicates whether the guest virtual address corresponding to the entry has been assigned a guest physical address, the entry corresponding to the guest virtual address that has been assigned the guest physical address further includes second information, and the second information is used to indicate an access permission of the assigned guest physical address; the processing unit determines a target entry from the page table of the sample process, where a value of first information of the target entry indicates that a guest virtual address corresponding to the target entry has been assigned a guest physical address, and an access permission indicated by second information of the target entry is execution allowed; the processing unit determines a target guest physical address based on the target entry, where the target guest physical address is a guest physical address that has been assigned to the guest virtual address corresponding to the target entry; the processing unit determines a target host physical address corresponding to the target guest physical address; and the processing unit monitors behavior of accessing memory space indicated by the target host physical address. According to the method provided in this application, when a specific guest virtual address in the page table of the process of the sample program is assigned a guest physical address, and an access permission of the guest physical address is execution allowed, it can be expected that code stored in memory space indicated by a host physical address corresponding to the guest physical address may be code newly added to the process. Therefore, through monitoring on behavior of accessing the memory space indicated by the host physical address, memory access or invoking for the newly added code of the process of the sample program can be monitored, thereby improving computer security.

Optionally, the monitoring memory space corresponding to the target host physical address includes: the processing unit separately records a mapping relationship between the target guest physical address and the target host physical address in a first view and a second view, where an access rule recorded in the first view for the host physical address used to store external code is access forbidden, an access rule recorded in the first view for the host physical address used to store internal code is access allowed, the access rule recorded in the second view for the host physical address used to store external code is access allowed, and the access rule recorded in the second view for the host physical address used to store internal code is access forbidden; the processing unit determines whether target code stored in the memory space indicated by the target host physical address is external code or internal code; the processing unit sets an access rule for the target host physical address in the first view and the second view based on a result of determining whether the target code is internal code or external code; if the target code is external code, the processing unit sets the access rule for the target host physical address in the first view to access forbidden, and sets the access rule for the target host physical address in the second view to access allowed; if the target code is internal code, the processing unit sets the access rule for the target host physical address in the first view to access allowed, and sets the access rule for the target host physical address in the second view to access forbidden; the processing unit receives exception information sent by a memory control unit, where the exception information is sent by the memory control unit after determining that an access rule recorded in a target view used at a target moment is access forbidden, the target moment is a moment when the memory control unit receives a memory access request for the target host physical address, the target view is a view used when the memory control unit controls the access to the target host physical address, and the target view is one of the first view and the second view; the processing unit monitors, based on the exception information, the sample process that generates the memory access request, and controls the memory control unit to switch the target view between the first view and the second view.

According to the method provided in this application, the processing unit may configure a first view and a second view; mapping relationships between the target guest physical address and the target host physical address indicated separately by the first view and the second view are the same; access rules for the target guest physical address indicated separately by the first view and the second view are different. An access rule recorded in the first view for memory space used to store external code is access forbidden, and an access rule recorded in the first view for memory space used to store internal code is access allowed. The access rule recorded in the second view for the memory space used to store external code is access allowed, and the access rule recorded in the second view for the memory space used to store internal code is access forbidden.

When a process starts to run, the processing unit sets the first view as a target view used when the memory control unit controls access to the memory. Therefore, when the process needs to invoke external code, the memory control unit reports page exception information to the processing unit because the target view (that is, the first view) indicates that a memory space access rule for the external code is access forbidden. Further, the processing unit can trigger monitoring on the sample process based on the page exception information, switch the target view from the first view to the second view, and resend the access request. Because the target view (that is, the second view) after switching indicates that the memory space access rule for the external code is access allowed, the memory control unit can allow the access. Therefore, when the code stored in the target guest physical address is external code, invoking of the external code by the sample process can be monitored.

During the invoking of the external code by the process, the target view is the second view. Therefore, when the external code needs to perform returning for the process, the memory control unit reports page exception information to the processing unit because the target view (that is, the second view) indicates that a memory space access rule for internal code is access forbidden. The processing unit can trigger monitoring on the process based on the page exception information, switch the target view from the second view to the first view, and resend the access request. Because the target view (that is, the first view) after switching indicates that the memory space access rule for the internal code is access allowed, the memory control unit can allow the access. Returning for the invoking can be monitored without affecting access of the process to the memory, and a monitoring occasion is added on the basis of monitoring on invoking of an external function by the process. Therefore, when the code stored in the target guest physical address is internal code, invoking of the internal code by the sample process can be monitored.

Optionally, the first view and the second view are extended page tables EPTs.

Optionally, that the processing unit determines whether target code stored in the memory space corresponding to the target host physical address is external code or internal code includes: the processing unit determines a target guest virtual address corresponding to the target guest physical address based on a page table of the sample process; the processing unit determines a virtual address range to which the target guest virtual address belongs from a virtual address descriptor VAD; and the processing unit determines whether the target code is external code or internal code based on a code segment name corresponding to the virtual address range recorded in the VAD.

Optionally, that the processing unit determines whether target code stored in the memory space corresponding to the target host physical address is external code or internal code includes: the processing unit determines a target guest virtual address corresponding to the target guest physical address based on a page table of the sample process; the processing unit determines a virtual memory area to which the target guest virtual address belongs; and the processing unit determines whether the target code is external code or internal code based on a type of code stored in the virtual memory area.

Optionally, the entry includes 64 bits.

The first information includes one bit, and the first information occupies the 0th bit among the 64 bits.

The second information includes one bit, and the second information occupies the 63rd bit among the 64 bits.

Optionally, the internal code includes code of a process function, and the process function is a function included in program code for generating the sample process.

Optionally, the external code includes code of an external function, and the external function is a function other than the process function.

Optionally, the external code includes at least one of process shared code and system kernel code.

According to a second aspect, an apparatus for monitoring memory access behavior of a sample process is provided. The apparatus includes: a memory and a processor, where the memory, configured to provide memory space, where the processor includes a memory control unit and at least one processing unit, the memory control unit, configured to control access of a processing unit to the memory space based on an access request sent by the processing unit; and the processing unit, configured to: determine a page table of the sample process based on a page directory base address of the sample process, where the sample process is a process generated after a monitored sample program runs, the page table of the sample process includes a plurality of entries, the plurality of entries are in one-to-one correspondence to a plurality of guest virtual addresses, each entry includes first information, the first information indicates whether the guest virtual address corresponding to the entry has been assigned a guest physical address, the entry corresponding to the guest virtual address that has been assigned the guest physical address further includes second information, and the second information is used to indicate an access permission of the assigned guest physical address; determine a target entry from the page table of the sample process, where a value of first information of the target entry indicates that a guest virtual address corresponding to the target entry has been assigned a guest physical address, and an access permission indicated by second information of the target entry is execution allowed; determine a target guest physical address that is assigned to the guest virtual address corresponding to the target entry; determine a target host physical address corresponding to the target guest physical address; and monitor behavior of accessing memory space indicated by the target host physical address.

According to the apparatus provided in this application, when a specific guest virtual address in the page table of the process of the sample program is assigned a guest physical address, and an access permission of the guest physical address is execution allowed, it can be expected that code stored in memory space indicated by a host physical address corresponding to the guest physical address may be code newly added to the process. Therefore, through monitoring on behavior of accessing the memory space indicated by the host physical address, memory access or invoking for the newly added code of the process of the sample program can be monitored, thereby improving computer security.

Optionally, the processing unit is configured to: separately record a mapping relationship between the target guest physical address and the target host physical address in a first view and a second view, where an access rule recorded in the first view for the host physical address used to store external code is access forbidden, an access rule recorded in the first view for the host physical address used to store internal code is access allowed, the access rule recorded in the second view for the host physical address used to store external code is access allowed, and the access rule recorded in the second view for the host physical address used to store internal code is access forbidden; set an access rule for the target host physical address in the first view and the second view based on a result of determining whether the target code is internal code or external code; if the target code is external code, set the access rule for the target host physical address in the first view to access forbidden, and set the access rule for the target host physical address in the second view to access allowed; and if the target code is internal code, set the access rule for the target host physical address in the first view to access allowed, and set the access rule for the target host physical address in the second view to access forbidden; the memory control unit is configured to: receive a memory access request for the target host physical address, and send exception information after determining that an access rule recorded in a target view used at a target moment is access forbidden, where the target moment is a moment when the memory control unit receives the memory access request, the target view is a view used when the memory control unit controls the access to the target host physical address, and the target view is one of the first view and the second view; the processing unit is configured to: monitor, based on the exception information, the sample process that generates the memory access request, and control the memory control unit to switch the target view between the first view and the second view.

According to the apparatus provided in this application, the processing unit may configure a first view and a second view; mapping relationships between the target guest physical address and the target host physical address indicated separately by the first view and the second view are the same; access rules for the target guest physical address indicated separately by the first view and the second view are different. An access rule recorded in the first view for memory space used to store external code is access forbidden, and an access rule recorded in the first view for memory space used to store internal code is access allowed. The access rule recorded in the second view for the memory space used to store external code is access allowed, and the access rule recorded in the second view for the memory space used to store internal code is access forbidden.

When a process starts to run, the processing unit sets the first view as a target view used when the memory control unit controls access to the memory. Therefore, when the process needs to invoke external code, the memory control unit reports page exception information to the processing unit because the target view (that is, the first view) indicates that a memory space access rule for the external code is access forbidden. Further, the processing unit can trigger monitoring on the sample process based on the page exception information, switch the target view from the first view to the second view, and resend the access request. Because the target view (that is, the second view) after switching indicates that the memory space access rule for the external code is access allowed, the memory control unit can allow the access. Therefore, when the code stored in the target guest physical address is external code, invoking of the external code by the sample process can be monitored.

During the invoking of the external code by the process, the target view is the second view. Therefore, when the external code needs to perform returning for the process, the memory control unit reports page exception information to the processing unit because the target view (that is, the second view) indicates that a memory space access rule for internal code is access forbidden. The processing unit can trigger monitoring on the process based on the page exception information, switch the target view from the second view to the first view, and resend the access request. Because the target view (that is, the first view) after switching indicates that the memory space access rule for the internal code is access allowed, the memory control unit can allow the access. Returning for the invoking can be monitored without affecting access of the process to the memory, and a monitoring occasion is added on the basis of monitoring on invoking of an external function by the process. Therefore, when the code stored in the target guest physical address is internal code, invoking of the internal code by the sample process can be monitored.

Optionally, the processing unit is configured to: determine a target guest virtual address corresponding to the target guest physical address based on a page table of the sample process, determine a virtual address range to which the target guest virtual address belongs from a virtual address descriptor VAD, and determine whether the target code is external code or internal code based on a code segment name corresponding to the virtual address range recorded in the VAD.

Optionally, the processing unit is configured to: determine a target guest virtual address corresponding to the target guest physical address based on a page table of the sample process, determine a virtual memory area to which the target guest virtual address belongs, and determine whether the target code is external code or internal code based on a type of code stored in the virtual memory area.

Optionally, the entry includes 64 bits.

The first information includes one bit, and the first information occupies the 0th bit among the 64 bits.

The second information includes one bit, and the second information occupies the 63rd bit among the 64 bits.

Optionally, the internal code includes code of a process function, and the process function is a function included in program code for generating the sample process.

Optionally, the external code includes code of an external function, and the external function is a function other than the process function.

Optionally, the external code includes at least one of process shared code and system kernel code.

According to a third aspect, a process monitoring method is provided. The method is performed by a computing device, and the computing device includes a processing unit and a memory. The method includes: the processing unit separately records a mapping relationship between a target guest physical address and a target host physical address in a first view and a second view, where an access rule recorded in the first view for the host physical address used to store external code is access forbidden, an access rule recorded in the first view for the host physical address used to store internal code is access allowed, the access rule recorded in the second view for the host physical address used to store external code is access allowed, and the access rule recorded in the second view for the host physical address used to store internal code is access forbidden; if the target code is external code, the processing unit sets the access rule for the target host physical address in the first view to access forbidden, and sets the access rule for the target host physical address in the second view to access allowed; if the target code is internal code, the processing unit sets the access rule for the target host physical address in the first view to access allowed, and sets the access rule for the target host physical address in the second view to access forbidden; the processing unit receives exception information sent by a memory control unit, where the exception information is sent by the memory control unit after determining that an access rule recorded in a target view used at a target moment is access forbidden, the target moment is a moment when the memory control unit receives a memory access request for the target host physical address, the target view is a view used when the memory control unit controls the access to the target host physical address, and the target view is one of the first view and the second view; the processing unit controls, based on the exception information, the memory control unit to switch the target view between the first view and the second view, and monitors the sample process that generates the memory access request.

According to the method provided in this application, the processing unit may configure a first view and a second view; mapping relationships between the target guest physical address and the target host physical address indicated separately by the first view and the second view are the same; access rules for the target guest physical address indicated separately by the first view and the second view are different. An access rule recorded in the first view for memory space used to store external code is access forbidden, and an access rule recorded in the first view for memory space used to store internal code is access allowed. The access rule recorded in the second view for the memory space used to store external code is access allowed, and the access rule recorded in the second view for the memory space used to store internal code is access forbidden.

When a process starts to run, the processing unit sets the first view as a target view used when the memory control unit controls access to the memory. Therefore, when the process needs to invoke external code, the memory control unit reports page exception information to the processing unit because the target view (that is, the first view) indicates that a memory space access rule for the external code is access forbidden. Further, the processing unit can trigger monitoring on the sample process based on the page exception information, switch the target view from the first view to the second view, and resend the access request. Because the target view (that is, the second view) after switching indicates that the memory space access rule for the external code is access allowed, the memory control unit can allow the access. Therefore, when the code stored in the target guest physical address is external code, invoking of the external code by the sample process can be monitored.

During the invoking of the external code by the process, the target view is the second view. Therefore, when the external code needs to perform returning for the process, the memory control unit reports page exception information to the processing unit because the target view (that is, the second view) indicates that a memory space access rule for internal code is access forbidden. The processing unit can trigger monitoring on the process based on the page exception information, switch the target view from the second view to the first view, and resend the access request. Because the target view (that is, the first view) after switching indicates that the memory space access rule for the internal code is access allowed, the memory control unit can allow the access. Returning for the invoking can be monitored without affecting access of the process to the memory, and a monitoring occasion is added on the basis of monitoring on invoking of an external function by the process. Therefore, when the code stored in the target guest physical address is internal code, invoking of the internal code by the sample process can be monitored.

Optionally, the first view and the second view are extended page tables EPTs.

Optionally, that the processing unit determines whether target code stored in the memory space corresponding to the target host physical address is external code or internal code includes: the processing unit determines a target guest virtual address corresponding to the target guest physical address based on a page table of the sample process; the processing unit determines a virtual address range to which the target guest virtual address belongs from a virtual address descriptor VAD; and the processing unit determines whether the target code is external code or internal code based on a code segment name corresponding to the virtual address range recorded in the VAD.

Optionally, that the processing unit determines whether target code stored in the memory space corresponding to the target host physical address is external code or internal code includes: the processing unit determines a target guest virtual address corresponding to the target guest physical address based on a page table of the sample process; the processing unit determines a virtual memory area to which the target guest virtual address belongs; and the processing unit determines whether the target code is external code or internal code based on a type of code stored in the virtual memory area.

According to a fourth aspect, a process monitoring apparatus is provided. The apparatus includes: a storage medium, configured to provide memory space; a memory control unit, configured to control access of a processing unit to the memory space based on an access request sent by the processing unit; and the processing unit, configured to: separately record a mapping relationship between a target guest physical address and a target host physical address in a first view and a second view, where an access rule recorded in the first view for the host physical address used to store external code is access forbidden, an access rule recorded in the first view for the host physical address used to store internal code is access allowed, the access rule recorded in the second view for the host physical address used to store external code is access allowed, and the access rule recorded in the second view for the host physical address used to store internal code is access forbidden; if the target code is external code, set the access rule for the target host physical address in the first view to access forbidden, and set the access rule for the target host physical address in the second view to access allowed; and if the target code is internal code, set the access rule for the target host physical address in the first view to access allowed, and set the access rule for the target host physical address in the second view to access forbidden; the memory control unit is configured to: receive a memory access request for the target host physical address, and send exception information after determining that an access rule recorded in a target view used at a target moment is access forbidden, where the target moment is a moment when the memory control unit receives the memory access request, the target view is a view used when the memory control unit controls the access to the target host physical address, and the target view is one of the first view and the second view; the processing unit is configured to: control, based on the exception information, the memory control unit to switch the target view between the first view and the second view.

According to the apparatus provided in this application, the processing unit may configure a first view and a second view; mapping relationships between the target guest physical address and the target host physical address indicated separately by the first view and the second view are the same; access rules for the target guest physical address indicated separately by the first view and the second view are different. An access rule recorded in the first view for memory space used to store external code is access forbidden, and an access rule recorded in the first view for memory space used to store internal code is access allowed. The access rule recorded in the second view for the memory space used to store external code is access allowed, and the access rule recorded in the second view for the memory space used to store internal code is access forbidden.

When a process starts to run, the processing unit sets the first view as a target view used when the memory control unit controls access to the memory. Therefore, when the process needs to invoke external code, the memory control unit reports page exception information to the processing unit because the target view (that is, the first view) indicates that a memory space access rule for the external code is access forbidden. Further, the processing unit can trigger monitoring on the sample process based on the page exception information, switch the target view from the first view to the second view, and resend the access request. Because the target view (that is, the second view) after switching indicates that the memory space access rule for the external code is access allowed, the memory control unit can allow the access. Therefore, when the code stored in the target guest physical address is external code, invoking of the external code by the sample process can be monitored.

During the invoking of the external code by the process, the target view is the second view. Therefore, when the external code needs to perform returning for the process, the memory control unit reports page exception information to the processing unit because the target view (that is, the second view) indicates that a memory space access rule for internal code is access forbidden. The processing unit can trigger monitoring on the process based on the page exception information, switch the target view from the second view to the first view, and resend the access request. Because the target view (that is, the first view) after switching indicates that the memory space access rule for the internal code is access allowed, the memory control unit can allow the access. Returning for the invoking can be monitored without affecting access of the process to the memory, and a monitoring occasion is added on the basis of monitoring on invoking of an external function by the process. Therefore, when the code stored in the target guest physical address is internal code, invoking of the internal code by the sample process can be monitored.

Optionally, the first view and the second view are extended page tables EPTs.

Optionally, that the processing unit determines whether target code stored in the memory space corresponding to the target host physical address is external code or internal code includes: the processing unit determines a target guest virtual address corresponding to the target guest physical address based on a page table of the sample process; the processing unit determines a virtual address range to which the target guest virtual address belongs from a virtual address descriptor VAD; and the processing unit determines whether the target code is external code or internal code based on a code segment name corresponding to the virtual address range recorded in the VAD.

Optionally, that the processing unit determines whether target code stored in the memory space corresponding to the target host physical address is external code or internal code includes: the processing unit determines a target guest virtual address corresponding to the target guest physical address based on a page table of the sample process; the processing unit determines a virtual memory area to which the target guest virtual address belongs; and the processing unit determines whether the target code is external code or internal code based on a type of code stored in the virtual memory area.

According to a fifth aspect, a chip is provided and includes at least one processing unit and at least one memory control unit, where the processing unit performs the method in the first aspect and any possible implementation of the first aspect, or the method in the third aspect and any possible implementation of the third aspect.

According to a sixth aspect, a computer system is provided and includes a processor and a memory, where the processor includes at least one processing unit and a memory control unit, the processing unit performs the method in the first aspect and any possible implementation of the first aspect, or the method in the third aspect and any possible implementation of the third aspect.

Optionally, the computing system further includes a system bus, and the system bus is configured to connect the processor (specifically, the memory control unit) and the memory.

According to a seventh aspect, a computer program product is provided, where the computer program product includes a computer program (which may also be referred to as code or an instruction), and when the computer program is run by a processing unit in a processor or in a chip, the processing unit is enabled to perform the method in the first aspect and any possible implementation of the first aspect, or the method in the third aspect and any possible implementation of the third aspect.

According to an eighth aspect, a computer-readable medium is provided, where the computer-readable medium stores a computer program (which may also be referred to as code or an instruction), and when the computer program runs on a processing unit in a processor or in a chip, the processing unit is enabled to perform the method in the first aspect and any possible implementation of the first aspect, or the method in the third aspect and any possible implementation of the third aspect.

DETAILED DESCRIPTION OF ILLUSTRATIVE EMBODIMENTS

The following describes technical solutions of this application with reference to accompanying drawings.

First, a computing device 100 that performs a process monitoring method in the embodiments of this application is described in detail with reference to FIG. 1.

The computing device may also be referred to as a computer system. From the perspective of logical layering, the computing device may include a hardware layer, an operating system layer that runs above the hardware layer, and an application layer that runs above the operating system layer. The hardware layer includes hardware such as a processing unit, a memory, and a memory control unit. Subsequently, functions and structures of the hardware are described in detail. The operating system may be any one or more computer operating systems that implement service processing by using a process, such as a Linux operating system, a Unix operating system, an Android operating system, an iOS operating system, or a Windows operating system. The application layer includes applications such as a browser, an address book, word processing software, and instant messaging software. In addition, in the embodiments of this application, the computer system may be a handheld device such as a smartphone, or may be a terminal device such as a personal computer. This is not specifically limited in this application, provided that the computer system can read program code that records the method for monitoring memory access behavior of a sample process in the embodiments of this application, and run the program code, to monitor a sample process based on the method for monitoring memory access behavior of a sample process in the embodiments of this application. The method for monitoring memory access behavior of a sample process in the embodiments of this application may be performed by the computer system, or may be performed by a functional module that can invoke and execute a program in the computer system.

In this application, the program or the program code refers to a group of ordered instructions (or code) used to implement a relatively independent function. The process is a process in which a program and data of the program run on a computer device. The program is usually designed through modularization; to be specific, a function of the program is detailed and decomposed into a plurality of smaller functional modules. The program includes at least one function, and the function is a code segment for implementing one functional module. Therefore, the function is a basic unit of function modularization of the program, and may also be considered as a child program.

Figure 1:
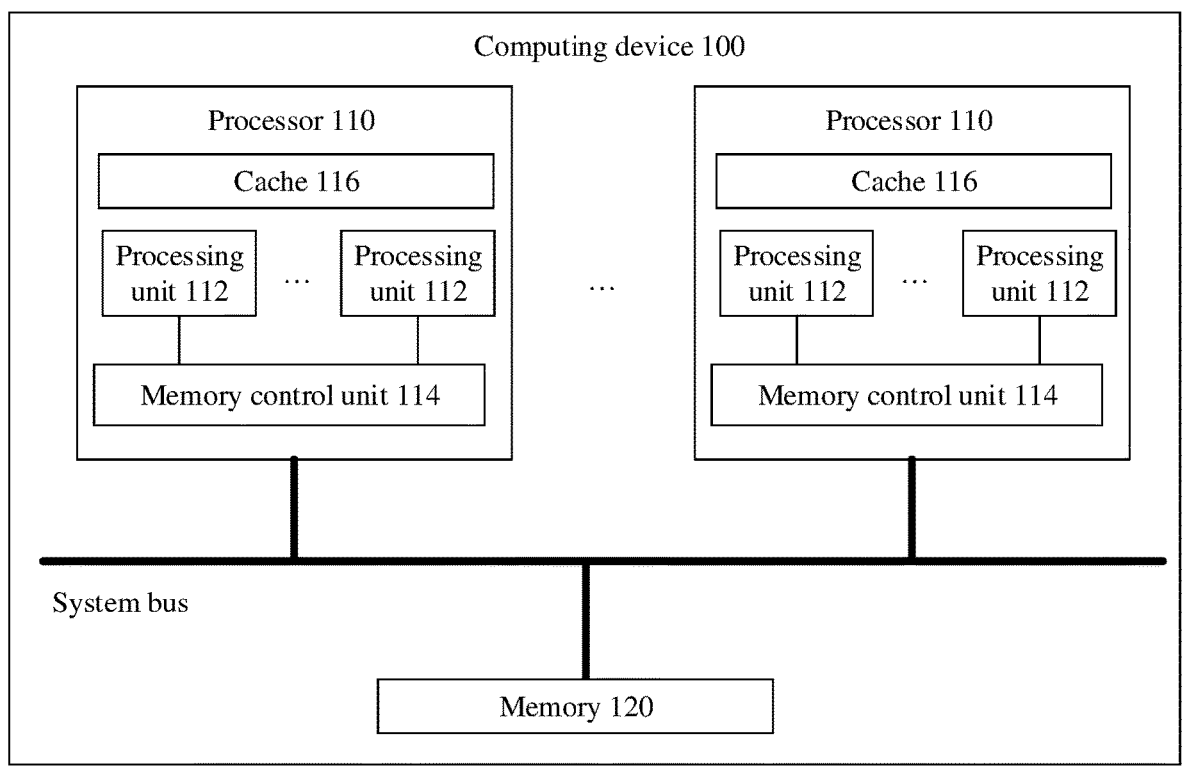
FIG. 1 is a schematic diagram of a hardware structure of a computer device (or a computer system) that is applicable to a process monitoring method and apparatus in an embodiment of this application.

FIG. 1 is a schematic architectural diagram of a computing device 100 according to an embodiment of this application. The computing device shown in FIG. 1 is configured to perform a process monitoring method. The computing device 100 may include at least one processor 110 and a memory 120.

Optionally, the computer device 110 may further include a system bus, and the processor 110 and the memory 120 each are connected to the system bus. The processor 110 can access the memory 120 by using the system bus. For example, the processor 110 can read and write data or execute code in the memory 120 by using the system bus.

A function of the processor 110 is mainly to explain an instruction (or code) of a computer program and process data in computer software. The instruction of the computer program and the data in the computer software may be stored in the memory 120 or a cache unit 116.

The processor 110 may be an integrated circuit chip and has a signal processing capability. The processor 110 may be a general-purpose processor, a digital signal processor (DSP), an application specific integrated circuit (ASIC), a field-programmable gate array (FPGA) or another programmable logical device, a discrete gate or transistor logic device, or a discrete hardware component. The general-purpose processor may be a microprocessor or the like. For example, the processor 110 may be a central processing unit (CPU).

Each processor 110 includes a memory control unit 114 and at least one processing unit 112.

The processing unit 112 may also be referred to as a core or a kernel, and is a most important component of the processor. The processing unit 112 may be made from monocrystalline silicon by using a specific production process, and all calculation, receiving commands, storage commands, and data processing of the processor are executed by the core. The processing unit can independently run a program instruction, and increase a running speed of a program by using a parallel computing capability. Various processing units have a fixed logical structure. For example, the processing unit includes logical units such as a level-1 cache, a level-2 cache, an execution unit, an instruction-level unit, and a bus interface.

The memory control unit 114 is configured to control data exchange between the memory 120 and the processing unit 112. Specifically, the memory control unit 114 may receive a memory access request from the processing unit 112, and control access to the memory based on the memory access request. As an example instead of a limitation, in the embodiments of this application, the memory control unit may be a component such as a memory management unit (MMU).

In the embodiments of this application, each memory control unit 114 can address the memory 120 by using the system bus. In addition, an arbiter (which is not shown in the figure) may be configured in the system bus, and the arbiter may be responsible for processing and coordinating contention access of a plurality of processing units 112.

In the embodiments of this application, the processing unit 112 may be communicatively connected to the memory control unit 114 by using a connection cable such as an address cable inside a chip, to implement communication between the processing unit 112 and the memory control unit 114.

Optionally, each processor 110 may further include the cache unit 116, and a cache is a data exchange buffer (referred to as a cache). When the processing unit 112 needs to read data, the processing unit 112 first searches the cache for required data. If the data is found, the processing unit 112 directly reads the data; if the data is not found, the processing unit 112 searches the memory for the data. Because the cache runs much faster than the memory, a function of the cache is to help the processing unit 112 run faster.

The memory 120 may provide running space for a process in the computing device 100, for example, the memory 120 may store a computer program (specifically, code of the program) for generating the process. In addition, the memory 120 may store data generated during running of the process, for example, intermediate data or process data. The memory may also be referred to as an internal memory, and is configured to temporarily store operation data in the processor 110 and data exchanged with an external memory such as a hard disk. As long as the computer is running, the processor 110 invokes data that needs to be operated to the memory for operation, and the processing unit 112 sends a result after the operation is completed.

The memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory 120 of the systems and methods described in this specification includes but is not limited to these and any memory of another proper type.

It should be understood that a structure of the foregoing enumerated computing device 100 is merely an example for description, and this is not limited in this application. The computing device 100 in the embodiments of this application may include various hardware in a computer system in the prior art. For example, the computing device 110 may further include a memory other than the memory 120, such as a magnetic disk memory.

In the embodiments of this application, a virtualization technology may be applied to the computing device 100. A plurality of virtual machines may simultaneously run on the computer device 100 by using the virtualization technology, at least one operating system may run on each virtual machine, and a plurality of programs run on each operating system.

The virtual machine is a complete computer system that is simulated by using software, has functions of a complete hardware system, and runs in a totally isolated environment. A physically existing computer on which a virtual machine runs may be referred to as a host. A physical address of a memory of the host may be referred to as a host physical address (HPA).

An operating system on which a virtual machine runs may be referred to as a guest. When a guest runs a process, the guest allocates a guest virtual address (GVA) to the process. GVA is a logical address that the process can understand.

Figure 2:
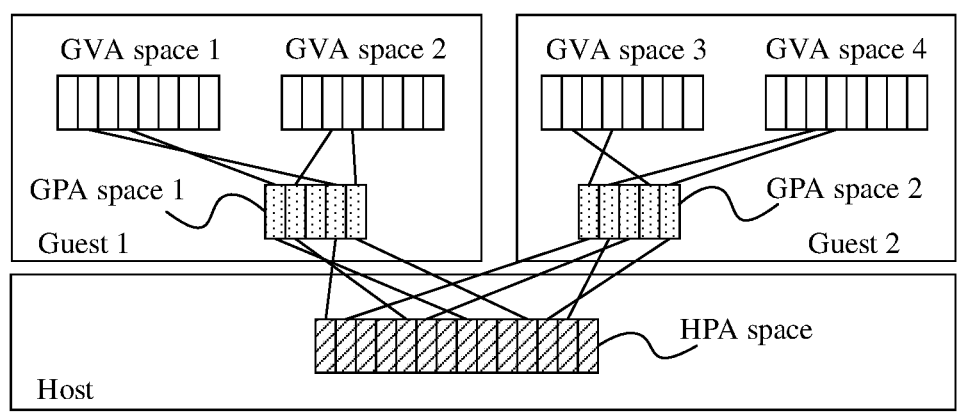
FIG. 2 is a schematic diagram of a virtualization logical architecture of a computer device that is applicable to an embodiment of this application.

As shown in FIG. 2, in the embodiments of this application, to enable a guest to use isolated and continuous memory space starting from zero, a concept of a guest physical address (GPA) is introduced. This address space is not real physical address space. For each guest, guest physical address space is continuous address space starting from zero. However, for the host, guest physical address space is not necessarily continuous, and the guest physical address space of one guest may be mapped to several discontinuous host physical address ranges. Therefore, a GVA needs to be mapped to a GPA and then to an HPA in order that a process in the guest accesses the memory of the host, that is, address translation.

Figure 3:
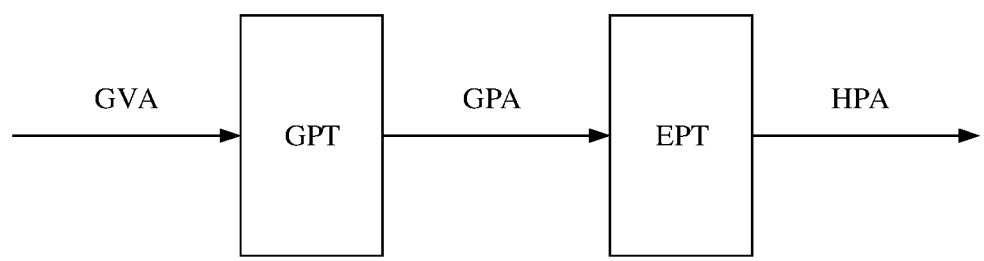
FIG. 3 is a schematic diagram of a memory addressing process based on the logical architecture shown in FIG. 2.

Optionally, FIG. 3 shows an implementation of the address translation. In the embodiments of this application, for example, a guest address page table (GPT) is configured in the processing unit, and an extended page table (EPT) is configured in the processing unit or a memory control unit. A page table is a management mode of address space. For details, refer to descriptions in related documents. Details are not described herein. The GPT may be maintained by the guest, and the EPT may be maintained by virtualization software on the host, for example, a virtual machine monitor (VMM) that runs on the host. The VMM is also referred to as a hypervisor. A sample process generated by a sample program runs on a virtual machine. A monitoring program runs outside the virtual machine (for example, on another virtual machine). The monitoring program is responsible for monitoring and recording behavior of the sample program (or the sample process) during execution.

For example, when a process (denoted as a process #X) in the virtual machine needs to access host physical address space (denoted as host physical space #X) in the memory of the host, and a virtual address (which corresponds to the host physical space #X) that is assigned by the virtual machine to the process #X is a GVA #X, the guest may determine, based on the GPT, a GPA (denoted as a GPA #X) corresponding to the GVA #X. Further, a memory control unit MMU of the host may determine, based on the EPT, an HPA (denoted as an HPA #X) corresponding to the GPA #X, to complete access to memory space corresponding to the HPA #X. The VMM in the host may record behavior that the sample process accesses the memory.

The following describes the GPT used in the embodiments of this application.

In a virtual memory, the page table is a mapping table, that is, mapping from GVA to GPA. GVA can also be referred to as a linear address.

In a typical 32-bit X86 system, a size of virtual memory user space (user space) of the system is 3 gigabytes (giga bytes, GB), and a size of each page is 4 kilobytes (KB). Then the 3G space has 3 GB/4 KB=786432 pages in total, and each page needs one PTE to store mapping information. Therefore, 786432 PTEs in total are required.

To store the foregoing large amount of information, a form of a hierarchical page table is proposed, that is, due to a localized characteristic of a program, this means that only a part of the memory is frequently accessed in a specific time. Specifically, program code, a heap, a shared library, and a stack used during running of the process are all always stored in a specific part of memory space, so that the memory space that is frequently accessed over a period of time is actually very sparse. Therefore, starting from the hardware level, the page table can be implemented in the form of a hierarchical page table.

To be specific, the hierarchical page table may include N levels, where N is a positive integer greater than or equal to 2. The i-th level page table in the N-level page table includes at least one entry, and each entry of the i-th level page table corresponds to one (i−1)-th level page table. The i-th level page table is an upper-level page table of the (i−1)-th level page table, where i∈[2, N].

Figure 4:
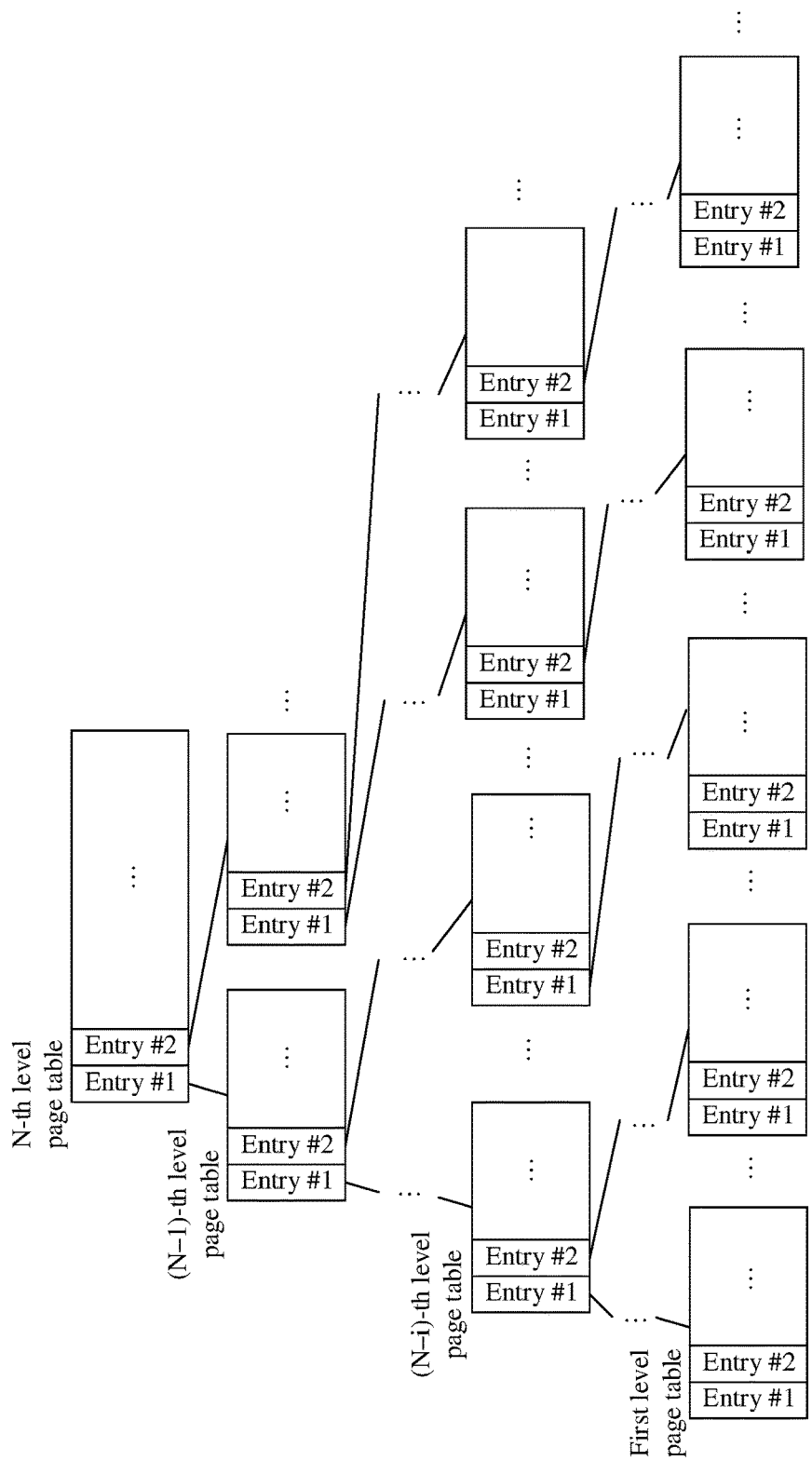
FIG. 4 is a schematic diagram of an example of a page table according to this application.

FIG. 4 is a schematic diagram of an example of a hierarchical page table. As shown in FIG. 4, the page table may include N levels (N is a natural number greater than or equal to 1), and each level of the page table may include a plurality of entries.

Each entry in the N-th level page table corresponds to one (N−1)-th level page table, each entry in the (N−1)-th level page table corresponds to one (N−2)-th level page table, and so on. That is, each entry in the (N−i)-th level page table corresponds to one (N−i−1)-th level page table, where 0≤i≤N−2.

In addition, in this application, the memory is divided into a plurality of levels of blocks. One level includes at least one block, and each level of block includes a plurality of lower-level blocks. In other words, for two adjacent levels, a higher-level block is divided into a plurality of lower-level blocks.

In this application, a quantity of levels of the page table corresponds to a quantity of levels of the block. In other words, in this application, each level of the page table corresponds to one level of block.

Assuming that the i-th level page table corresponds to the j-th level block, one entry in the i-th level page table corresponds to one lower-level block of the j-th level block (that is, one (j−1)-th level block).

In this application, one GVA can be divided into a plurality of parts (N parts) by bit, and each part corresponds to one level of the page table in the N-level page table. Each part includes an index, and the index of each part is used to indicate one entry in the page table corresponding to the part.

To be specific, assuming that the i-th part of the GVA corresponds to the i-th level page table, an index of the i-th part may indicate an entry in the i-th level page table (suppose the entry is the v-th entry in the i-th level page table). It can be considered that memory space indicated by a physical address corresponding to the GVA is located in a block corresponding to the v-th entry, and an upper-level block of the block is a block corresponding to the i-th level page table (that is, a j-th level block); the v-th entry corresponds to an (i−1)-th level page table, that is, the (i−1)-th level page table corresponding to the v-th entry corresponds to a (j−1)-th level block.

Figure 5:
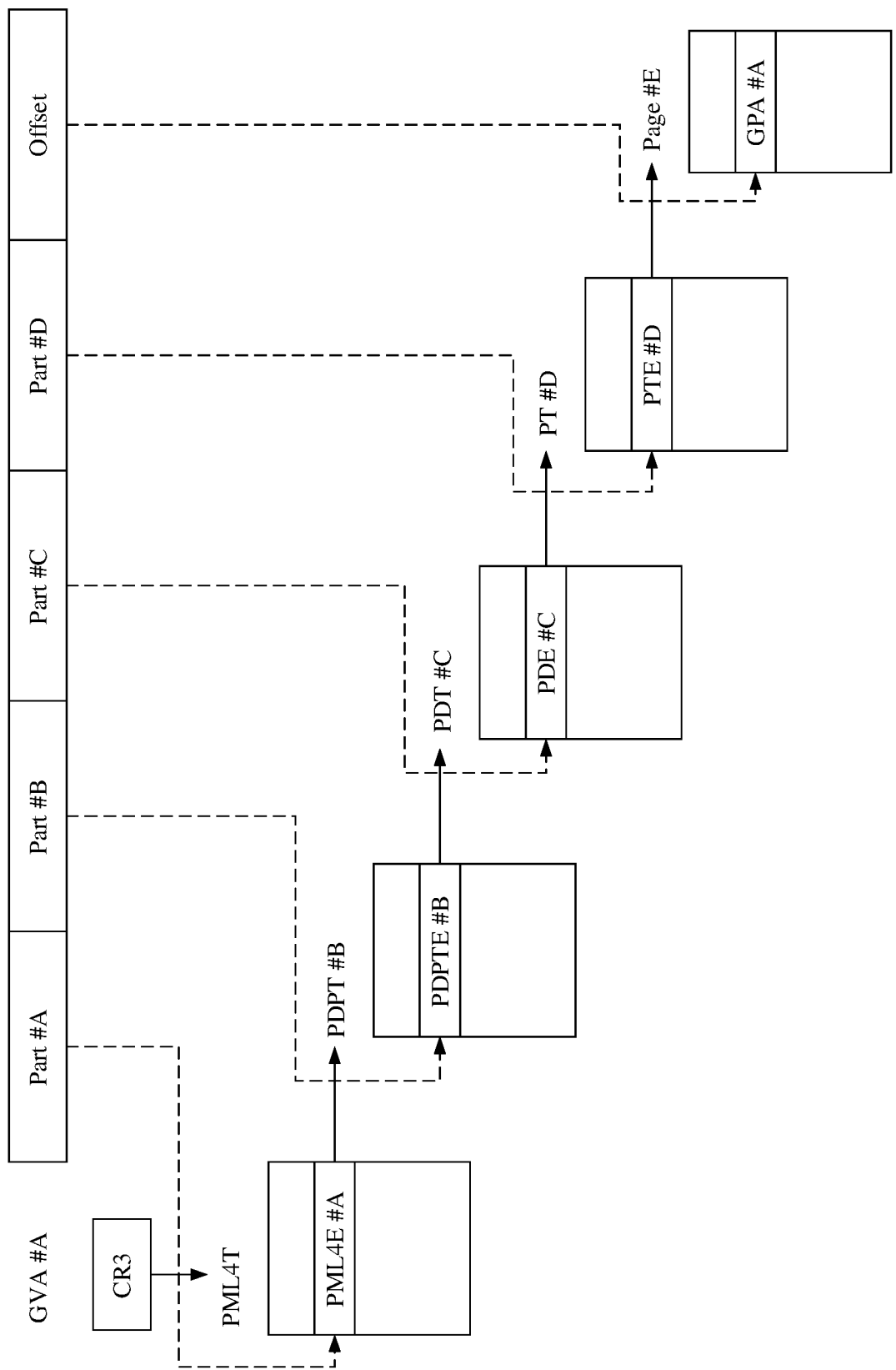
FIG. 5 is a schematic diagram of an example of a four-level page table according to this application.

For example, as shown in FIG. 5, a part #A may correspond to the highest-level page table, that is, a table page map level 4 table (table page map level 4 table, PML4T). A part #B may correspond to a lower-level page table of the PML4T, that is, a page directory pointer table (page directory Pointer table, PDPT). A part #C may correspond to a lower-level page table of the PDPT, that is, a page directory table (page directory table, PDT). A part #D may correspond to a lower-level page table of the PDT, that is, a page table (PT). It should be noted that, in addition to the foregoing N parts, a GVA may further include an address offset.

For example, as shown in FIG. 5, each entry in the last-level page table (for example, the first-level page table) of the foregoing N-level page table corresponds to one page, and the foregoing offset is used to indicate a position of the physical address (specifically, the GPA) on the page.

Therefore, based on the foregoing level-by-level page table query, a physical address (that is, a GPA) corresponding to a GVA (which may also be referred to as a linear address) can be determined. As an example instead of a limitation, in this application, a size of each page table may be 4 KB, each page table may include 512 entries, and a size of each entry may be 8 bytes.

For example, a value of N may be 2, that is, the GPT may include a two-level page table. The two-level page table may include a PDT (which may also be referred to as a page directory, PGD) and a PT. In this case, the process of addressing from the GVA to the GPA can be implemented in the following manner:

1. A GVACR3 register stores a base address of a PGD. The processing unit reads the base address of the PGD from the CR3 register, and intercepts the 22nd to the 31st bits from the GVA. By using the base address of the PGD as a start position and using the 22nd to the 31st bits intercepted from the GVA as an offset, the processing unit locates the PGD that describes the GVA.

2. The processing unit can intercept the 12th to the 21st bits from the GVA. The processing unit locates an entry corresponding to the GVA in the PGD by using the first entry in the PGD as a start position and using the 12th to the 21st bits intercepted from the GPA as an offset, and determines a PT corresponding to the entry as the PT of the GVA.

3. The processing unit can intercept the 0th to the 11th bits from the GVA. The processing unit locates an entry (that is, a GPA) corresponding to the GVA in the PT by using the first entry (that is, a GPA) in the PT as a start position and using the 0th to the 11th bits intercepted from the GVA as an offset, to finally complete the conversion from the GVA to the GPA.

It can be seen from the foregoing process that, the hierarchical parsing process of the GVA is actually a process of entering the page table level by level and gradually locating a final address. Therefore, this process is referred to as page table walk.

For another example, a value of N may be 3, that is, the GPT may include a three-level page table. Specifically, after a physical address extension (PAE) is introduced, a physical memory (36 bits) larger than 4 GB can be supported, but a virtual address is still 32 bits, and the GPA is extended from 4 bytes to 8 bytes. This means that a quantity of entries that can be stored in each PT is changed from 1024 to 512, and the foregoing two-level page table are not applicable. Therefore, the page table level has changed, and a new level called a page middle directory (PMD) can be added.

In this case, the page table walk is still similar to the two-level page table, except one more level. To be specific, the PGD points to the PMD, and then the PMD points to the PT.

For another example, a value of N may be 4, that is, the GPT may include a four-level page table. With the development of hardware, especially the emergence of 64-bit processors, the three-level page table hardly meets needs of the processors. Therefore, the four-level page table has emerged. For example, to be compatible with the original three-level page table, a unique shared top level, that is, a table page map level 4 table (PML4T) is set. A base address of the PML4T is stored in the CR3. In other words, the PML4T is shared by all GVAs, and there is no need to add an indication part of the PML4T to the GVA, so that the four-level page table can be compatible with the foregoing three-level page table solution.

In addition, in the four-level page table, the first-level page table may be referred to as a page table (PT), and an entry in the PT may be referred to as a PT entry (PTE).

In the four-level page table, the second-level page table may be referred to as a page directory table (PDT), and an entry in the PDT may be referred to as a page directory entry (PDE).

In the four-level page table, the third-level page table may be referred to as a page directory pointer table (PDPT), and an entry in the PDPT may be referred to as a PDPT entry (PDPTE).

In addition, an entry in the PML4T may be referred to as a PML4 entry (table page map level 4 entry, PML4E).

FIG. 5 is a schematic diagram of an addressing process in which the processing unit determines the GPA (denoted as the GPA #A) corresponding to the GVA #A based on the four-level page table after obtaining the GVA #A.

In this application, the GVA may have 48 bits in total. In addition, the GVA is divided into five parts, which are respectively denoted as a part #A, a part #B, a part #C, a part #D, and an offset. For example, the part #A occupies the 39th to the 47th bits of the GVA, the part #B occupies the 30th to the 38th bits of the GVA, the part #C occupies the 21st to the 29th bits of the GVA, the part #D occupies the 12th to the 20th bits of the GVA, and the offset occupies the 0th to the 11th bits of the GVA.

The part #A corresponds to the PML4T, the part #B corresponds to the PDPT, the part #C corresponds to the PDT, the part #D corresponds to the PT, and the offset indicates an offset of the GPA in the PT. As shown in FIG. 5, first, the processing unit can obtain the base address of the four-level page table (specifically, the PML4T) from the CR3 register, and the base address indicates a start position of the table page map level 4 table PML4T.

The processing unit can determine the entry corresponding to the GVA #A in the PML4T, which is denoted as PML4E #A, based on the part (that is, the part #A) corresponding to the PML4T in the GVA #A.

Further, the processing unit can determine the PDPT corresponding to the PML4E #A, which is denoted as PDPT #B.

Then, the processing unit can determine the entry corresponding to the GVA #A in the PDPT #B, which is denoted as PDPTE #B, based on the part (that is, the part #B) corresponding to the PDPT in the GVA #A.

Then, the processing unit can determine the PDT corresponding to the PDPTE #B, which is denoted as PDT #C.

Then, the processing unit can determine the entry corresponding to the GVA #A in the PDT #C, which is denoted as PDE #C, based on the part (that is, the part #C) corresponding to the PDT in the GVA #A.

Then, the processing unit can determine the PT corresponding to the PDE #C, which is denoted as PT #D.

Then, the processing unit can determine the entry corresponding to the GVA #A in the PT #D, which is denoted as PTE #D, based on the part (that is, the part #D) corresponding to the PT in the GVA #A.

Then, the processing unit can determine the 4 KB page corresponding to the PTE #D, which is denoted as page #E.

Therefore, the processing unit can determine the physical address (that is, the GPA #A) corresponding to the GVA #A from the page #E based on the offset in the GVA #A.

During the access of the process to a GPA, the operating system automatically maintains, manages, and maps the foregoing page tables, and converts the GVA to the GPA based on the page tables and content of page table entries in the page tables. When a process accesses a GPA for the first time, the operating system generates a page fault exception, and handles the page fault exception, and allocates a physical memory to the GVA during the handling of the page fault exception.

The following describes the EPT used in the embodiments of this application.

In the embodiments of the present invention, the EPT not only records a mapping relationship between a GPA and an HPA, but also can record an access rule (or an access permission) of the HPA (specifically, memory space indicated by the HPA).

As an example instead of a limitation, in the embodiments of this application, the access permission may include three types: read, write, and execution. Correspondingly, in the EPT, three fields may be set for the memory space indicated by the HPA, to respectively indicate specific states of the three permissions.

For example, a field #0 may be used to carry a bit (denoted as a bit #0) that indicates a read access permission, and the bit #0 may be used to indicate whether the memory space (specifically, data in the memory space) corresponding to the HPA (or the GPA) is allowed to be read by the guest. The bit #0 may include one bit or may include a plurality of bits. This is not specifically limited in this application, provided that the processing unit 112 and the memory control unit 114 can agree on explanations of different values of the bit #0. For example, when the bit #0 is "0", it may indicate that the memory space is not allowed to be read by the guest. For another example, when the bit #0 is "1", it may indicate that the memory space is allowed to be read by the guest.

For another example, a field #1 may be used to carry a bit (denoted as a bit #1) that indicates a write access permission, and the bit #1 may be used to indicate whether the memory space corresponding to the HPA (or the GPA) is allowed to be written by the guest. The bit #1 may include one bit or may include a plurality of bits. This is not specifically limited in this application, provided that the processing unit 112 and the memory control unit 114 can agree on explanations of different values of the bit #1. For example, when the bit #1 is "0", it may indicate that the memory space is not allowed to be written by the guest. For another example, when the bit #1 is "1", it may indicate that the memory space is allowed to be written by the guest.

For another example, a field #2 may be used to carry a bit (denoted as a bit #2) that indicates an execution access permission, and the bit #2 may be used to indicate whether the memory space (specifically, code or an instruction stored in the memory space) corresponding to the HPA (or the GPA) is allowed to be executed by the guest. The bit #2 may include one bit or may include a plurality of bits. This is not specifically limited in this application, provided that the processing unit 112 and the memory control unit 114 can agree on explanations of different values of the bit #2. For example, when the bit #2 is "0", it may indicate that the memory space is not allowed to be executed by the guest. For another example, when the bit #2 is "1", it may indicate that the memory space is allowed to be executed by the guest.

In this application, an execution access permission is emphatically set; to be specific, a value of the field #2 is set. Without distinction, setting an access rule for a segment of memory space specifically refers to setting the execution access permission. For example, setting an access rule for a specific segment of memory space to access forbidden refers to execution forbidden, and setting an access rule for a specific segment of memory space to access allowed refers to execution allowed. A corresponding access permission flag is set in the EPT page table, to control access of the guest to a specific physical page. When the guest violates control over an access permission of a corresponding flag bit during execution, for example, reads content of a physical page whose read access permission is set to access forbidden, a page exception (EPT violation) is triggered.

A non-execute (NX) flag of the specific physical page is set in the EPT page table; to be specific, a bit #2 flag bit corresponding to the physical page in an entry of the EPT page table is set, to monitor behavior that the guest executes code in the specific physical page. For example, when a process in the guest invokes an external function, the instruction execution is redirected to code of a physical page in which the external function is located. If a non-execute flag is set on the physical page, a page exception is immediately triggered.

In this application, the EPT may be in single view mode or in dual-view mode. The single view mode may mean that the memory control unit performs memory access based on only one EPT view. The dual-view mode may mean that the processing unit and the memory control unit can perform memory access based on two EPT views.

Specifically, the two views may be referred to as an indoor view and an outdoor view. Both the indoor view and the outdoor view record the mapping relationships between a plurality of GPAs and a plurality of HPAs.

Specifically, assuming that a GPA #1 and an HPA #1 have a mapping relationship, the mapping relationship between the GPA #1 and the HPA #1 is recorded in the indoor view and the outdoor view. In addition, access rules for the HPA #1 recorded in the indoor view and the outdoor view are different.

In this application, the memory control unit can determine one of the indoor view and the outdoor view as a target view based on an instruction of the processing unit, and control access to the memory space based on the target view. In addition, the processing unit can instruct the memory control unit to switch the target view based on exception request information reported by the memory control unit.

For example, it is assumed that the target view used by the memory control unit at a moment #1 is the indoor view.

At the moment #1, after receiving an access request that carries a GPA #1, the memory control unit can determine an HPA corresponding to the GPA #1 as an HPA #1 based on the target view (that is, the indoor view) used at the moment #1. In addition, the memory control unit can read an access rule for the HPA #1 recorded in the target view. If the access rule is access forbidden, the memory control unit may send exception request information to the processing unit.

After receiving the exception request information, the processing unit can determine that a sample process that generates the access request requests to access forbidden memory space, so as to monitor the sample process.

It should be noted that the monitoring may be specifically implemented by using a VMM. Monitored content includes but is not limited to obtaining of context information of the sample process, a function name of the invoked external code, a parameter value transmitted when invoking occurs, a return value, and the like. Content and a process of monitoring on the sample process by the processing unit may be similar to those in the prior art. To avoid repetition, detailed descriptions thereof are omitted herein.

In addition, the processing unit may send a switching instruction to the memory control unit at a moment #2 (after the moment 1) to instruct the memory control unit to switch the target view. The memory control unit receives the switching instruction, and switches the target view based on the switching instruction, that is, switches the target view from the indoor view to the outdoor view. The target view used by the memory control unit after the moment #2 is the outdoor view.

At a moment #3 (after the moment #2), the processing unit may resend the access request that carries the GPA #1 to the memory control unit. After receiving the access request that carries the GPA #1, the memory control unit can determine an HPA corresponding to the GPA #1 as an HPA #1 based on the target view (that is, the outdoor view) used at the moment #3. In addition, the memory control unit reads an access rule for the HPA #1 recorded in the target view.

Because the target view used at the moment #3 is different from the target view used at the moment #1, the access rule for the HPA #1 recorded in the target view used at the moment #3 is different from the access rule for the HPA #1 recorded in the target view used at the moment #1. To be specific, the access rule for the HPA #1 recorded in the target view used at the moment #3 is access allowed. Therefore, the memory control unit may allow access to the memory space indicated by the HPA #1 based on the access request, for example, reading and execution of the code stored in the memory space indicated by the HPA #1. In this way, the access of the process to the memory space indicated by the HPA #1 is completed. Therefore, in the embodiments of this application, the process can be monitored without affecting accesses of the process to the memory.

Optionally, in this application, an access rule recorded in the indoor view for memory space used to store external code may be access forbidden, and an access rule recorded in the indoor view for memory space used to store internal code may be access allowed. In addition, the access rule recorded in the outdoor view for the memory space used to store external code may be access allowed, and the access rule recorded in the outdoor view for the memory space used to store internal code may be access forbidden.

Optionally, in this application, each process may correspond to one indoor view and one outdoor view, and after detecting that a process is running, the processing unit may set the indoor view corresponding to the process as the target view.

The following describes the "internal code" and the "external code".

Figure 6:
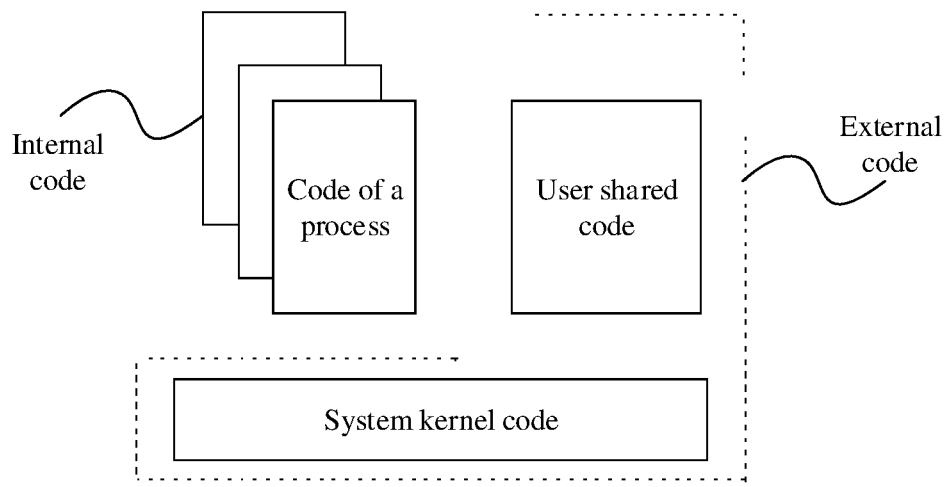
FIG. 6 is a schematic diagram of classification of code stored in a memory according to an embodiment of this application.

As shown in FIG. 6, in the embodiments of this application, code stored in the memory may be categorized into two types: internal code and external code.

The internal code and the external code are relative to a process generated by a program. For the process, the internal code is code of the program that generates the process, belongs to the process, and is code that is not shared with another process, for example, a segment (usually a TEXT segment) that has an executable attribute in a PE file of a Windows process. T1 is used to represent a code segment of a process 1. An internal code set Tall of all processes running in the system is {T1, T2, . . . , Tn}, and n represents a quantity of processes running in the system. The processes are categorized into a sample process and a non-sample process. The sample process is a process whose behavior needs to be monitored by the sandbox system, and includes a process generated by a sample program and a child process that is further generated by the process generated by the sample program. The non-sample process is another normal process that runs in the system, and is not monitored by the sandbox system. It is defined that s-Tall={s-T1, s-T2, . . . , s-Ti} represents a code set of all the sample processes (or the sample programs), and ns-Tall={ns-T1, ns-T2, . . . , ns-Tj} represents a code set of all the non-sample processes (or the non-sample programs), and therefore Tall is {s-Tall, ns-Tall}.

The external code is global code shared by all processes. For example, the external code may further include code of an external function. The external function may be a function other than a process function, and the process function is a function included in program code for generating a process. For example, the code of the external function may include code of a user-mode shared library (or may be referred to as process shared code), such as kernel32.dll and user32.dll that are in a Windows system, and a c-runtime library libc.so in a Linux system. For another example, the external code may further include all kernel mode code, such as kernel code of an operating system and code of a device driver. As an example instead of a limitation, in the embodiments of this application, only one piece of external code may exist in the memory 120. Each process maps these shared physical memories to virtual address space of the process through virtual memory mapping, so as to implement sharing.

Assuming Sdll represents the code of the user-mode shared library, Skernel represents the kernel code of the operating system, and Sdriver1 represents code of a device driver 1, an external code set Sall is {Skernel, Sdll1, Sdriver2, Sdll2, Sdriver2, . . . , Sdlln, Sdrivern}.

In the embodiments of this application, in one view (either the indoor view or the outdoor view), the same access rule is set for all HPAs in the indicated memory space for storing external code. For example, for the HPA, an access rule for the foregoing HPA in the indoor view is set to access forbidden, and an access rule for the foregoing HPA in the outdoor view is set to access allowed. In addition, in the embodiments of this application, in one view (either the indoor view or the outdoor view), the same access rule is set for all HPAs in the indicated memory space for storing internal code. For example, for the HPA, an access rule for the HPA used to store internal code in the indicated memory space in the indoor view is set to access allowed; an access rule for the HPA used to store internal code in the indicated memory space in the outdoor view is set to access forbidden. In this way, the process can be monitored and accessed easily by using two views.

The computer device 100 shown in FIG. 1 in the embodiments of this application may be a host in which a sandbox system is located. A virtual machine that runs on the computer device 100 provides a running environment of a sample program, and monitors, by using a VMM or a monitoring program that runs on a secure virtual machine, an access behavior of a sample process generated by the sample program.

A sandbox technology is generated in a historical background. With continuous development of advanced persistent threat (APT) attacks, advanced malicious code is also advancing rapidly, and it is increasingly difficult for conventional static malicious code detection that is based on a feature code matching technology to deal with the advanced malicious code. A feature detection technology that is based on dynamic behavior during program running is gradually accepted and adopted by a security vendor. It is proved by practice that the sandbox is an effective system for detecting malicious code based on monitoring of dynamic behavior. An isolated real running environment is constructed, and all behavior of the sample program (specifically, a process generated by a sample process) during execution are monitored and recorded, and submitted to a back-end analysis engine for analysis, to determine whether code of the sample program is malicious code.

Various steps completed by the processing unit in the method for monitoring memory access behavior of a sample process in the embodiments of this application may be directly executed by a hardware decoding processing unit, or executed by a combination of hardware and a software module in the decoding processing unit. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes steps in methods in the embodiments in combination with hardware of the processor.

In modern operating systems such as the Windows operating system, there are many scenarios in which an executable code segment may be newly added to a program, such as the following scenarios:

Scenario 1: The program directly applies for an executable memory. The sample program invokes a memory application interface provided by the system, such as the VirtualAlloc interface, and sets the last parameter of the interface to PAGE_EXECUTE, so that the newly applied memory has an executable permission. In this way, an executable code segment is newly added to the process.

Scenario 2: The program loads a new third-party DLL. The sample program loads an existing system DLL or third-party DLL into the memory space of the sample process by invoking a DLL loading interface provided by the system, such as the LoadLibrary interface. In this way, the executable code segment of the DLL is newly added to the sample process.

Scenario 3: remote application for a memory. The sample program invokes an interface such as VirtualAllocEx provided by the system, and specifies the first parameter hProcess as a descriptor of other processes, and specifies the last parameter as PAGE_EXECUTE. In this way, an executable code segment is newly added to other processes.

Scenario 4: DLL injection. DLL injection is a common secret loading technology. The DLL injection technology can force a remote process to load a malicious DLL program. DLL injection is also the most commonly used secret loading technology. Through DLL injection, code can be injected into a remote process and the remote process is enabled to invoke LoadLibrary. In this way, the remote process is forced to load a DLL program into a context of the remote process. There are many ways of DLL injection. Through these ways, a DLL can be loaded into the sample process, and therefore an executable code segment is newly added to the sample process. Common DLL injection methods are as follows:

A. Injection by using a remote thread
B. Injection by using a global message hook
C. Injection by using a registry
D. Injection by using SetThreadContet
E. Injection by using an APC According to the method provided in the embodiments of this application, in the foregoing scenario, an access operation on the newly added code segment can be effectively monitored.

Figure 7:
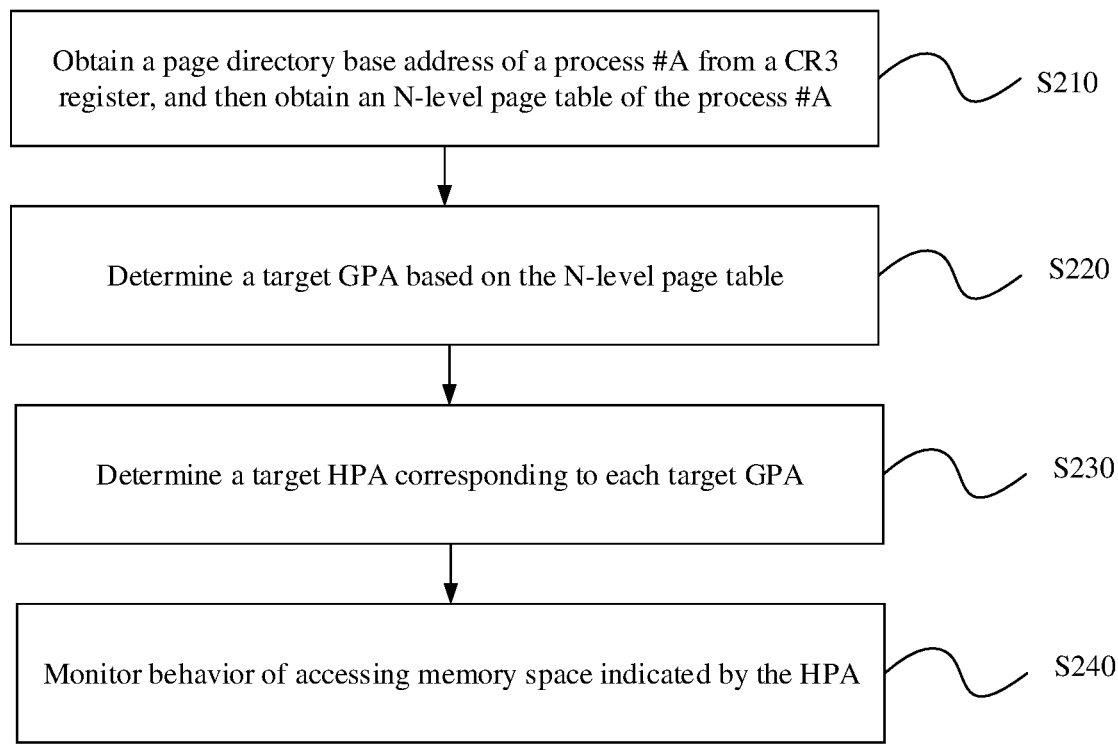
FIG. 7 is a schematic diagram of an example of a method for monitoring memory access behavior of a sample process according to this application.

With reference to FIG. 7, the following uses a program that needs to be monitored (denoted as a program #A) as an example, to describe in detail a method 200 for monitoring memory access behavior of a sample process in the embodiments of this application.

The program #A may be any one of a plurality of programs that need to be monitored. Whether a program needs to be monitored can be determined by an administrator, a program that performs a monitoring process, or software.

S210: After the program #A runs, the processing unit may generate a process #A.

The processing unit can determine a page table corresponding to the process #A. For example, the page table may be the foregoing N-level (for example, four-level) page table. For example, the processing unit can obtain a page directory base address of the process #A from the CR3 register, determine a start address of the N-level page table, and then obtain the N-level page table of the process #A.

S220: The processing unit can determine a target entry from the N-level page table and a target GPA corresponding to the target entry.

As described above, each entry of the page table may correspond to one GVA. In this embodiment, the target entry is an entry for which a corresponding GVA has been assigned a GPA, and an access permission of the GPA is execution allowed. For ease of understanding and description, the process of determining the target entry is described in detail by using the processing procedure when N=4 (that is, the process #A corresponds to the four-level page table) as an example.

First, the processing unit determines a PML4T (denoted as a PML4T #A) corresponding to the process #A. It is assumed that the PML4T #A includes K entries, that is, K PML4TEs. The processing unit can determine a first target entry from the K PML4TEs. The first target entry refers to a PML4TE that meets the following condition: A lower-level page table (for example, a PDPT, a PDT, or a PT) includes an entry for which a GPA has been assigned, and an access permission of the GPA is execution allowed.

In this embodiment, each PML4TE may include information #1 and information #2. The information #1 is used to indicate whether a lower-level page table (for example, a PDPT, a PDT, or a PT) indicated by the PML4TE includes an entry for which a GPA has been assigned. The information #2 is used to indicate whether an access permission of the GPA assigned to the lower-level page table (for example, a PDPT, a PDT, or a PT) indicated by the PML4TE is execution allowed. In other words, the information #2 is used to indicate whether the access permission of the GPA assigned to the lower-level page table (for example, a PDPT, a PDT, or a PT) indicated by the PML4TE is execution forbidden.

The processing unit can determine the first target entry from the K PML4TEs based on the information #1 and the information #2 in each PML4TE. For example, in this application, each PML4TE may include 64 bits. The information #1 may be indicated by one bit, or in other words, the information #1 may occupy one of the 64 bits. For example, the information #1 may include a value of the 0th bit among the 64 bits of the PML4TE.

For example, if the bit value of the information #1 is a specified first value (for example, 1), the information #1 indicates that the lower-level page table (for example, a PDPT, a PDT, or a PT) indicated by the PML4TE includes the entry for which a GPA has been assigned. For another example, if the bit value of the information #1 is a specified second value (for example, 0), the information #1 indicates that the lower-level page table (for example, a PDPT, a PDT, or a PT) indicated by the PML4TE does not include the entry for which a GPA has been assigned.

In addition, the information #2 may be indicated by one bit, or in other words, the information #2 may occupy one of the 64 bits. For example, the information #2 may include a value of the 63rd bit among the 64 bits of the PML4TE. For example, if the bit value of the information #2 is a specified third value (for example, 0), the information #2 indicates that an access permission of a GPA assigned to an entry in the lower-level page table (for example, a PDPT, a PDT, or a PT) indicated by the PML4TE is execution allowed. For another example, if the bit value of the information #2 is a specified fourth value (for example, 1), the information #2 indicates that the access permission of the GPA assigned to the entry in the lower-level page table (for example, a PDPT, a PDT, or a PT) indicated by the PML4TE is execution forbidden.

It should be understood that the quantity of bits included in the information #1 and the information #2 listed above is merely example description, and this application is not limited thereto. A user can arbitrarily set or change the quantity of bits included in the information #1 or the information #2 as needed. In addition, a meaning of a specific value of the information #1 and the information #2 listed above is merely example description, and this application is not limited thereto. The user can arbitrarily set or change the meaning of the specific value of the information #1 or the information #2 as needed. In addition, the information #1 or the information #2 may not belong to the PML4TE, or in other words, the information #1 or the information #2 may not be formed by the bits in the PML4TE, or in other words, the information #1 or the information #2 may be independent of the PML4TE. This is not specifically limited in this application.

Assuming that a quantity of first target entries is M, the processing unit can traverse the M first target entries. For ease of understanding, a processing procedure of the m-th PML4TE (denoted as a PML4TE #m) among the M first target entries is used as an example for description, where K is a positive integer, and K≥M≥m≥1.

Then, the processing unit determines a PDPT (denoted as a PDPT #A) corresponding to the PML4TE #m.

For example, the processing unit can store a first mapping relationship, and the first mapping relationship may indicate a PDPT corresponding to each PML4TE in the PML4T. Therefore, the processing unit can determine the PDPT corresponding to the PML4TE #m based on the first mapping relationship.

For another example, each PML4TE in the PML4T may include indication information #A, and the indication information #A may be used to indicate a start position of the PDPT corresponding to the PML4TE, and a quantity of entries (that is, PDPTEs) included in the PDPT. Alternatively, the indication information #A may be used to indicate the start position and an end position of the PDPT corresponding to the PML4TE. Therefore, the processing unit can determine the PDPT corresponding to the PML4TE #m according to the indication information #A.

Assuming that the PDPT #A includes L entries, that is, L PDPTEs, the processing unit can determine a second target entry from the L PDPTEs. The second target entry refers to a PDPTE that meets the following condition: A lower-level page table (for example, a PDT or a PT) includes an entry for which a GPA has been assigned, and an access permission of the GPA is execution allowed.

In this application, each PDPTE may include information #3 and information #4. The information #3 is used to indicate whether a lower-level page table (for example, a PDT or a PT) indicated by the PDPTE includes an entry for which a GPA has been assigned. The information #4 is used to indicate whether an access permission of the GPA assigned to the lower-level page table (for example, a PDT or a PT) indicated by the PDPTE is execution allowed. In other words, the information #4 is used to indicate whether the access permission of the GPA assigned to the lower-level page table (for example, a PDT or a PT) indicated by the PDPTE is execution forbidden.

The processing unit can determine the second target entry from the L PDPTEs based on the information #3 and the information #4 in each PDPTE. Optionally, in this application, each PDPTE may include 64 bits. The information #3 is indicated by one bit, or in other words, the information #3 occupies one of the 64 bits. For example, the information #3 may include a value of the 0th bit among the 64 bits of the PDPTE. For example, if the bit value of the information #3 is a specified fifth value (for example, 1), the information #3 indicates that the lower-level page table (for example, a PDT or a PT) indicated by the PDPTE includes the entry for which a GPA has been assigned. For another example, if the bit value of the information #3 is a specified sixth value (for example, 0), the information #3 indicates that the lower-level page table (for example, a PDT or a PT) indicated by the PDPTE does not include the entry for which a GPA has been assigned.

Optionally, the information #4 is indicated by one bit, or in other words, the information #4 may occupy one of the 64 bits. For example, the information #4 includes a value of the 63rd bit among the 64 bits of the PDPTE. For example, if the bit value of the information #4 is a specified seventh value (for example, 0), the information #4 indicates that an access permission of a GPA assigned to an entry in the lower-level page table (for example, a PDT or a PT) indicated by the PDPTE is execution allowed. For example, if the bit value of the information #4 is a specified eighth value (for example, 1), the information #4 indicates that the access permission of the GPA assigned to the entry in the lower-level page table (for example, a PDT or a PT) indicated by the PDPTE is execution forbidden.

It should be understood that the quantity of bits included in the information #3 and the information #4 listed above is merely example description, and this application is not limited thereto. A user can arbitrarily set or change the quantity of bits included in the information #3 or the information #4 as needed. In addition, a meaning of a specific value of the information #3 and the information #4 listed above is merely example description, and this application is not limited thereto. The user can arbitrarily set or change the meaning of the specific value of the information #3 or the information #4 as needed. In addition, the information #3 or the information #4 may not belong to the PDPTE, or in other words, the information #3 or the information #4 may not be formed by the bits in the PDPTE, or in other words, the information #3 or the information #4 may be independent of the PDPTE. This is not specifically limited in this application.

Assuming that a quantity of second target entries is U, the processing unit can traverse the U second target entries. For ease of understanding, a processing procedure of the u-th PDPTE (denoted as a PDPTE #u) among the U second target entries is used as an example for description, where U is a positive integer, and $U \geq u \geq 1$.

The processing unit can determine the PDT (denoted as a PDT #A) corresponding to the PDPTE #u. For example, the processing unit can store a second mapping relationship, and the second mapping relationship may indicate a PDT corresponding to each PDPTE in the PDPT. Therefore, the processing unit can determine the PDT corresponding to the PDPTE #u based on the second mapping relationship.

For another example, each PDPTE in the PDPT may include indication information #B, and the indication information #B may be used to indicate a start position of the PDT corresponding to the PDPTE, and a quantity of entries (that is, PDTEs) included in the PDT. Alternatively, the indication information #B may be used to indicate the start position and an end position of the PDT corresponding to the PDPTE. Therefore, the processing unit can determine the PDT corresponding to the PDPTE #u according to the indication information #B.

It is assumed that the PDT #A includes Q entries, that is, Q PDEs. The processing unit can determine a third target entry from the Q PDEs. The third target entry refers to a PDE that meets the following condition: A lower-level page table (for example, a PT) includes an entry for which a GPA has been assigned, and an access permission of the GPA is execution allowed.

Optionally, in this application, each PDE includes information #5 and information #6. The information #5 is used to indicate whether a lower-level page table (for example, a PT) indicated by the PDE includes an entry for which a GPA has been assigned. The information #6 is used to indicate whether an access permission of the GPA assigned to the lower-level page table (for example, a PT) indicated by the PDE is execution allowed. In other words, the information #6 is used to indicate whether the access permission of the GPA assigned to the lower-level page table (for example, a PT) indicated by the PDE is execution forbidden.

The processing unit can determine the third target entry from the Q PDPTEs based on the information #5 and the information #6 in each PDE.

Optionally, in this application, each PDE may include 64 bits. The information #5 may be indicated by one bit, or in other words, the information #5 may occupy one of the 64 bits. For example, the information #5 may include a value of the 0th bit among the 64 bits of the PDE. For example, if the bit value of the information #5 is a specified ninth value (for example, 1), the information #5 indicates that the lower-level page table (for example, a PT) indicated by the PDE includes the entry for which a GPA has been assigned. For example, if the bit value of the information #5 is a specified tenth value (for example, 0), the information #5 indicates that the lower-level page table (for example, a PT) indicated by the PDE does not include the entry for which a GPA has been assigned. In addition, the information #6 may be indicated by one bit, or in other words, the information #6 occupies one of the 64 bits. For example, the information #6 may include a value of the 63rd bit among the 64 bits of the PDE. For example, if the bit value of the information #6 is a specified eleventh value (for example, 0), the information #6 indicates that an access permission of a GPA assigned to an entry in the lower-level page table (for example, a PT) indicated by the PDE is execution allowed. For another example, if the bit value of the information #6 is a specified twelfth value (for example, 1), the information #6 indicates that the access permission of the GPA assigned to the entry in the lower-level page table (for example, a PT) indicated by the PDE is execution forbidden.

It should be understood that the quantity of bits included in the information #5 and the information #6 listed above is merely example description, and this application is not limited thereto. A user can arbitrarily set or change the quantity of bits included in the information #5 or the information #6 as needed. In addition, a meaning of a specific value of the information #5 and the information #6 listed above is merely example description, and this application is not limited thereto. The user can arbitrarily set or change the meaning of the specific value of the information #5 or the information #6 as needed. In addition, the information #5 or the information #6 may not belong to the PDE, or in other words, the information #5 or the information #6 may not be formed by the bits in the PDE, or in other words, the information #5 or the information #6 may be independent of the PDE. This is not specifically limited in this application.

Assuming that a quantity of third target entries is T, the processing unit can traverse the T third target entries. For ease of understanding, a processing procedure of the t-th PDE (denoted as a PDE #t) among the T third target entries is used as an example for description, where T is a positive integer, and T≥t≥1.

The processing unit can determine the PT (denoted as a PT #A) corresponding to the PDE #t. For example, the processing unit can store a third mapping relationship, and the third mapping relationship may indicate a PT corresponding to each PDE in the PDT. Therefore, the processing unit can determine the PT corresponding to the PDE #t based on the third mapping relationship.

For another example, each PDE in the PDT may include indication information #C, and the indication information #C may be used to indicate a start position of the PT corresponding to the PDE, and a quantity of entries (that is, pages) included in the PT. Alternatively, the indication information #C may be used to indicate the start position and an end position of the PT corresponding to the PDE. Therefore, the processing unit can determine the PT corresponding to the PDE #t according to the indication information #C.

It is assumed that the PT #A includes P entries, that is, P PTEs. The processing unit can determine a fourth target entry from the P PTEs. The fourth target entry refers to a PTE that meets the following condition: A lower-level page table (for example, a page) has been assigned a GPA, and an access permission of the GPA is execution allowed. In this application, each PTE may include information #7 and information #8. The information #7 is used to indicate whether a lower-level page table (for example, a page) indicated by the PTE includes an entry for which a GPA has been assigned. The information #8 is used to indicate whether an access permission of the GPA assigned to the lower-level page table (for example, a page) indicated by the PTE is execution allowed, or in other words, the information #8 is used to indicate whether the access permission of the GPA assigned to the lower-level page table (for example, a page) indicated by the PTE is execution forbidden. The processing unit can determine the fourth target entry from the P PTEs based on the information #7 and the information #8 in each PTE.

Optionally, in this application, each PTE may include 64 bits. The information #7 may be indicated by one bit, or in other words, the information #7 may occupy one of the 64 bits. For example, the information #7 may include a value of the 0th bit among the 64 bits of the PTE. Optionally, if the bit value of the information #7 is a specified thirteenth value (for example, 1), the information #7 indicates that the lower-level page table (for example, a page) indicated by the PTE includes the entry for which a GPA has been assigned. For another example, if the bit value of the information #7 is a specified fourteenth value (for example, 0), the information #7 indicates that the lower-level page table (for example, a page) indicated by the PTE does not include the entry for which a GPA has been assigned. In addition, the information #8 may be indicated by one bit, or in other words, the information #8 may occupy one of the 64 bits. For example, the information #8 may include a value of the 63rd bit among the 64 bits of the PTE. For example, if the bit value of the information #8 is a specified fifteenth value (for example, 0), the information #8 indicates that an access permission of a GPA assigned to an entry in the lower-level page table (for example, a page) indicated by the PTE is execution allowed. For another example, if the bit value of the information #8 is a specified sixteenth value (for example, 1), the information #8 indicates that the access permission of the GPA assigned to the entry in the lower-level page table (for example, a page) indicated by the PTE is execution forbidden.

It should be understood that the quantity of bits included in the information #7 and the information #8 listed above is merely example description, and this application is not limited thereto. A user can arbitrarily set or change the quantity of bits included in the information #7 or the information #8 as needed. In addition, a meaning of a specific value of the information #7 and the information #8 listed above is merely example description, and this application is not limited thereto. The user can arbitrarily set or change the meaning of the specific value of the information #7 or the information #8 as needed. In addition, the information #7 or the information #8 may not belong to the PTE, or in other words, the information #7 or the information #8 may not be formed by the bits in the PTE, or in other words, the information #7 or the information #8 may be independent of the PTE. This is not specifically limited in this application.

Then, the processing unit can determine the GPA recorded in the page indicated by each fourth target entry (for example, an entry with a value 1 of the 0th bit and a value 0 of the 63rd bit among the included 64 bits) as the target GPA.

Therefore, the GPA (that is, the target physical address) whose access permission is execution allowed and that is recorded in the N-level page table (specifically, each page corresponding to the N-level page table) can be determined by traversing each entry in the N-level page table.

S230: The processing unit determines an HPA (denoted as a target HPA) corresponding to each target GPA. Optionally, in this application, the HPA corresponding to each target GPA is queried from the EPT.

S240: The processing unit monitors behavior of accessing memory space indicated by the target HPA.

As described above, in this application, an EPT in single view mode or an EPT in dual-view mode may be used. The processing unit may have different monitoring manners in different modes.

For example, when the memory control unit uses the EPT in single view mode, the processing unit sets the access rule for the target HPA (or the memory space indicated by the target HPA) in the EPT to access forbidden. When receiving an access request that carries the target GPA, the memory control unit can determine the target HPA based on the EPT, and trigger a page table exception when determining that the access rule for the target HPA is access forbidden. In this way, the processing unit can monitor, based on the page table exception, behavior of accessing the target HPA (or the memory space indicated by the target HPA).

For example, when the memory control unit uses the EPT in dual-view mode, the processing unit records a mapping relationship between the target GPA and the target HPA in the indoor view and the outdoor view. Access rules for the same HPA in the indoor view and the outdoor view are different. In this case, the processing unit further needs to determine access rules for the target HPA (or the memory space indicated by the target HPA) in the indoor view and the outdoor view, respectively.

Figure 8:
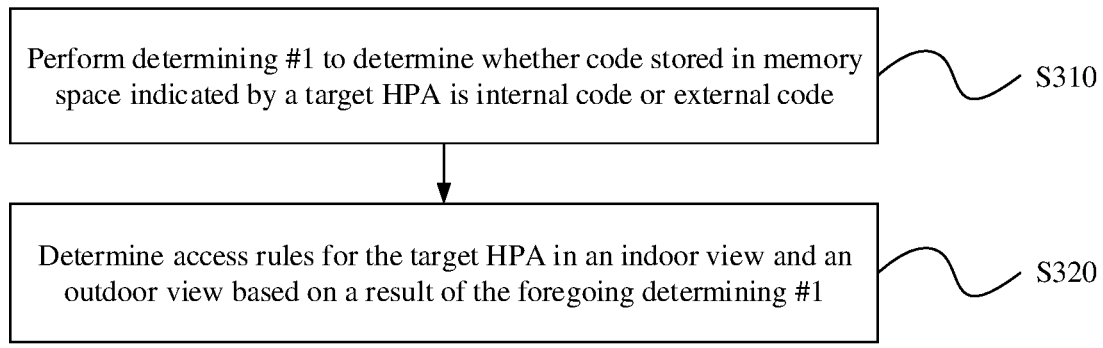
FIG. 8 is a schematic diagram of an example of a method for determining an access rule in each view in dual-view mode according to this application.

The following describes in detail a method 300 for determining an access rule in each view in dual-view mode with reference to FIG. 8.

For ease of understanding and description, a process of determining access rules for the HPA #X (or the HPA #X) recorded in the indoor view and the outdoor view is used as an example for description.

S310: The processing unit determines whether the memory space indicated by the target HPA stores internal code or external code.

Optionally, in this application, the foregoing determining can be performed in any one of the following manners.

Manner 1: determining based on a virtual address descriptor (VAD)

Specifically, the Windows operating system divides 4 GB GVA space for each process. The 4 GB GVA space includes lower 2 GB user address space and higher 2 GB system address space. The user address space of each process is isolated from each other and invisible to other processes. However, the system address space is shared among various processes, and there are different views for the processes. Private data code of a user and a loaded dynamic link library (DLL) are both stored in the user address space.

The operating system uses a virtual address descriptor to record which space in the 2G user address space is reserved, which space is assigned (or submitted), and which space is accessed. In Windows, each process is described by one EPROCESS structure. This structure includes a domain MM_AVL_TABLE VadRoot, which is a portal to the process VAD. A logical structure of the VAD is an AVL (Adelson-Velskii and Landis) self-balancing binary tree. This organization manner facilitates quick search. Each node in the tree represents one segment of virtual address space. Therefore, a code segment, a data segment, and a heap segment of a program each occupy one or more VAD nodes, which are entirely described by one MMVAD structure. In this way, the address space segment described by the VAD of each process can be displayed. A file name (FileName) field in a file pointer (FilePointer) structure in a control area (ControlArea) structure of each VAD node is used to record a name of a code segment corresponding to the VAD node.

In this application, the processing unit may use an inverse process corresponding to the foregoing determining of the host physical address based on the GVA, and determine the GPA (denoted as the GPA #X) corresponding to the HPA #X based on the foregoing EPT. Further, the processing unit can determine the GVA (denoted as the GVA #X) corresponding to the GPA #X based on the foregoing N-level page table. Then, the processing unit can read memory content from the VAD tree, search for a node in the binary tree to which the GVA #X belongs, and obtain a name of a code segment in which the GVA #X is located based on the FileName field in the FilePointer structure in the ControlArea structure of the node.

Further, the processing unit can determine whether the code stored in the HPA #X is internal code or external code based on the name of the code segment. Optionally, if the name of the code segment in which the GVA #X is located is: \Windows\System32\ntdll.dll, the code stored in the HPA #X can be determined to be a shared code segment of the system, that is, external code. If the name of the code segment in which the GVA #X is located is a program name, the code stored in the HPA #X can be determined to be a code segment of the program, that is, internal code.

Manner 2: determining based on a virtual memory area (virtual memory area, VMA)

Specifically, on the Linux system, the GVA space of the user process includes several areas. Optionally, these areas may have the following attributes or purposes:

1. Store binary code of an executable file, that is, a code segment of a program.
2. Store a data segment of a global variable.
3. Store a local variable and a stack for implementing function call.
4. Store an environment variable and a command line parameter.
5. Store code of a dynamic library used by a program.
6. Used to map file content.

Therefore, it can be seen that the virtual memory space of the process is divided into several different areas, each area has its related attributes and purposes, a legal GVA always falls within a specific area, and these areas do not overlap. In the kernel, such an area is referred to as a virtual memory area.

In this application, the processing unit may use an inverse process corresponding to the foregoing determining of the host physical address based on the GVA, and determine the GPA (denoted as the GPA #X) corresponding to the HPA #X based on the foregoing EPT. Further, the processing unit can determine the GVA (denoted as the GVA #X) corresponding to the GPA #X based on the foregoing N-level page table. Then, the processing unit can determine a VMA (denoted as a VMA #X) to which the GVA #X belongs.

The processing unit can determine the attribute or purpose of the VMA #X. Further, the processing unit can determine whether the code stored in the HPA #X is internal code or external code based on the attribute or purpose of the VMA #X. Optionally, if the attribute or purpose of the VMA #X is to store a data segment of a global variable or store a local variable and a stack for implementing function call, and so on, the code stored in the HPA #X can be determined to be a shared code segment of the system, that is, external code. If the attribute or purpose of the VMA #X is to store binary code of an executable file or store code of a dynamic library used by a program, the code stored in the HPA #X can be determined to be a code segment of the program, that is, internal code.

S320: The processing unit can set the access rules for the HPA #X in the indoor view and the outdoor view based on the determining result in step S310.

For example, if the code stored in the HPA #X is external code, the processing unit can set the access rule for the HPA #X in the indoor view to access forbidden, and set the access rule for the HPA #X in the outdoor view to access allowed. For another example, if the code stored in the HPA #X is internal code, the processing unit can set the access rule for the HPA #X in the indoor view to access allowed, and set the access rule for the HPA #X in the outdoor view to access forbidden.

Figure 9:
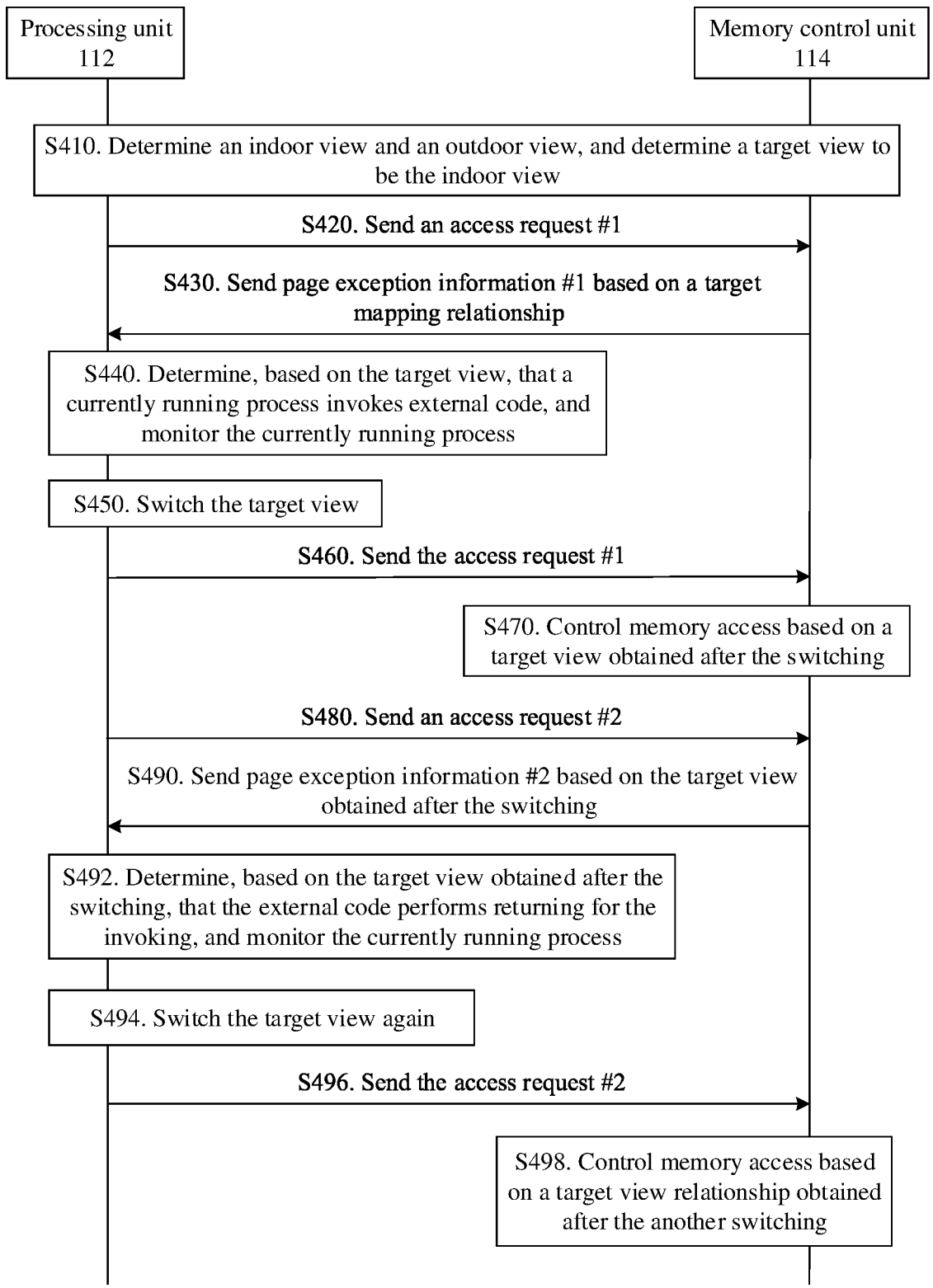
FIG. 9 is a schematic interaction diagram of a process monitoring method according to an embodiment of this application.

The following describes in detail a monitoring method 400 in dual-view mode with reference to FIG. 9.

For ease of understanding and description, a process in which a process (denoted as a process #α) invokes external code (denoted as external code #β) is used as an example to describe the method 400 in detail.

In the embodiments of this application, a process includes a sample process that needs to be monitored (for example, a process generated by a sample program) and a non-sample process that does not need to be monitored (for example, a process generated by a non-sample program). The process #α may be a sample process or may be a non-sample process. This is not specifically limited in this application.

Optionally, the external code #β includes code of one or more external functions. For example, the external code #β includes one or more pieces of inter-process shared code. For another example, the external code #β may include one or more pieces of system kernel code.

For ease of understanding, in the following, memory space used to store the external code #β in a memory 120 is denoted as memory space #β, an HPA of the memory space #β is denoted as an HPA #β, and a guest physical address of the memory space #β is denoted as a guest physical address #β. To be specific, in the embodiments of this application, the HPA #β may be an HPA of memory space that stores one or more pieces of code in the Sall. In addition, memory space used to store code of the process #α (or code of a program for generating the process #α) in the memory 120 is denoted as memory space #α, an HPA of the memory space #α is denoted as an HPA #α, and a guest physical address of the memory space #α is denoted as a guest physical address #α.

As shown in FIG. 9, in S410, a processing unit 112 determines an indoor view and an outdoor view. The indoor view and the outdoor view are used to indicate the mapping relationship between the HPA #β and the guest physical address #β. In addition, the indoor view and the outdoor view are used to indicate the mapping relationship between the HPA #α and the guest physical address #α.

Herein, the manner in which the processing unit determines the correspondence between the HPA and the GPA that needs to be recorded in the indoor view and the outdoor view may be similar to the manner described in the foregoing method 200, and details are not described again.

In this embodiment of this application, the indoor view and the outdoor view are further used to indicate the access rules for the HPA #β. The access rules for the HPA #β indicated by the indoor view and the outdoor view are different. The indoor view and the outdoor view are further used to indicate the access rules for the HPA #α. The access rules for the HPA #α indicated by the indoor view and the outdoor view are different.

In the indoor view, the access rule for the HPA #β is set to access forbidden, so as to monitor the behavior of the process for invoking external code. Optionally, the access forbidden means that the memory space #β indicated by the HPA #β is not allowed to be read, the access forbidden means that the memory space #β indicated by the HPA #β is not allowed to be written, or the access forbidden means that code stored in the memory space #β indicated by the HPA #β is not allowed to be executed. Alternatively, the access forbidden may mean that reading and writing are forbidden at the same time; the access forbidden may mean that reading and execution are forbidden at the same time; and so on.

In the outdoor view, the access rule for the HPA #β is set to access allowed. Optionally, the access allowed means that the memory space #β indicated by the HPA #β is allowed to be read, the access allowed means that the memory space #β indicated by the HPA #β is allowed to be written, or the access allowed means that code stored in the memory space #β indicated by the HPA #β is allowed to be executed. Alternatively, the access allowed may mean that reading and writing are allowed at the same time; the access allowed may mean that reading and execution are allowed at the same time; and so on.

The access rule for the HPA #α in the outdoor view may be set to access forbidden, so as to monitor returning of the process from external code to internal code. Optionally, the access forbidden means that the memory space #α indicated by the HPA #α is not allowed to be read, the access forbidden means that the memory space #α indicated by the HPA #α is not allowed to be written, or the access forbidden means that code stored in the memory space #α indicated by the HPA #α is not allowed to be executed. Alternatively, the access forbidden may mean that reading and writing are forbidden at the same time; the access forbidden may mean that reading and execution are forbidden at the same time; and so on.

In the indoor view, the access rule for the HPA #α is set to access allowed. Optionally, the access allowed means that the memory space #α indicated by the HPA #α is allowed to be read, the access allowed means that the memory space #α indicated by the HPA #α is allowed to be written, or the access allowed means that code stored in the memory space #α indicated by the HPA #α is allowed to be executed. Alternatively, the access allowed may mean that reading and writing are allowed at the same time; the access allowed may mean that reading and execution are allowed at the same time; and so on.

The method and the process for setting the access rules for the HPA in the indoor view and the outdoor view are similar to the method and the process described in the foregoing method 300, and details are not described again.

Figure 10:
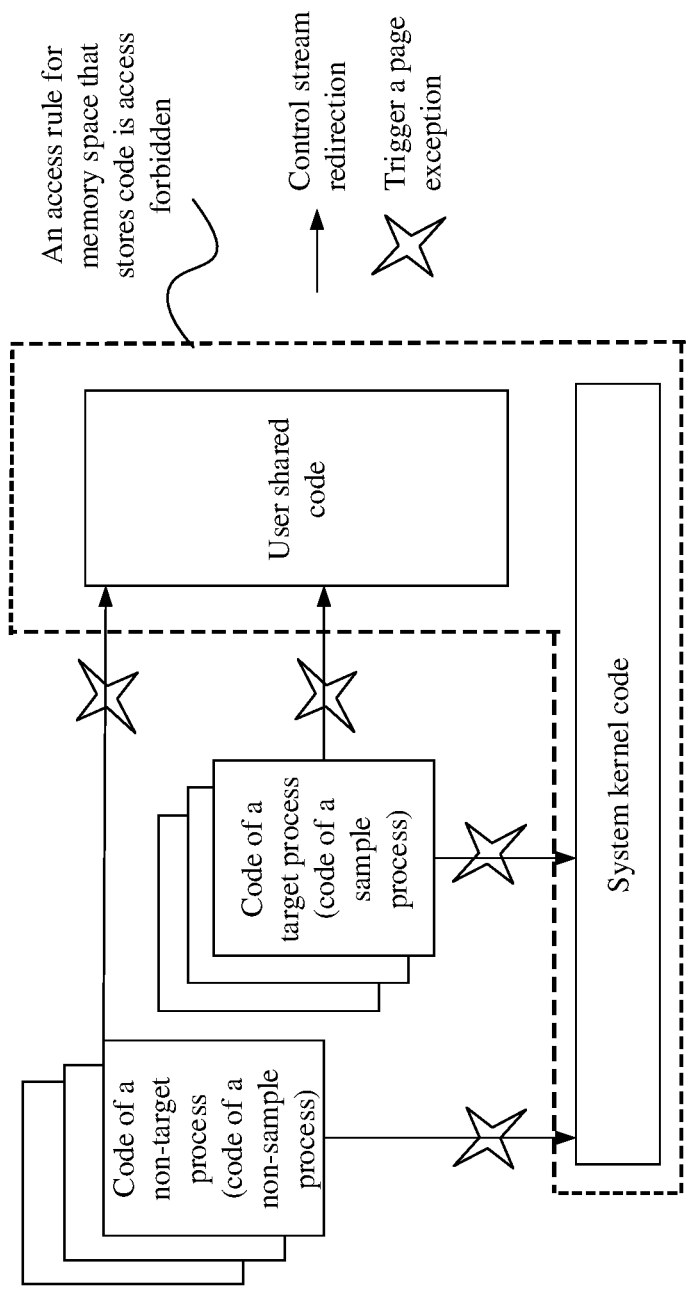
FIG. 10 is a schematic diagram of an example of an access rule recorded in an indoor view for a physical address of storage space of external code according to an embodiment of this application.

Optionally, as shown in FIG. 10, in the embodiments of this application, all access rules for the memory space (for example, the memory space #β) used to store external code in the indoor view are set to access forbidden. In addition, in the embodiments of this application, although not shown in FIG. 10, all access rules for the memory space used to store external code in the outdoor view are set to access allowed.

In this application, in the same period of time, the memory control unit uses only one of the indoor view and the outdoor view to control memory access, and the view used when the memory control unit controls memory access is referred to as the target view.

The following describes in detail processes of determining the target view and using the target view.

In this embodiment of this application, when the processing unit 112 detects that the process #α starts to run (denoted as a moment #1), the processing unit 112 sets the target view to the indoor view.

In a period (denoted as a period #a) between the moment #1 and a moment #2, the target view used when the memory control unit 114 controls access to the memory 120 is the indoor view. The moment #2 is a moment at which the processing unit 112 performs switching processing #1 on the target view.

S420: At a moment in the period #a (or a moment after the moment #1), the processing unit 112 needs to access the memory space #β in a process of executing the code of the process #α. For example, the code of the process #α indicates that external code stored in the memory space #β needs to be invoked (or executed). The processing unit 112 determines the guest physical address (that is, the GPA #β) of the memory space #β.

The processing unit 112 sends an access request #1 to the memory control unit 114, and the access request #1 carries the GPA #β.

Correspondingly, the memory control unit 114 receives the access request #1, and the memory control unit 114 searches the current target view (the indoor view) for the HPA (that is, the HPA #β) corresponding to the GPA #β. In addition, the memory control unit 114 determines, based on the current target view (the indoor view), that an access rule for the memory space (that is, the memory space #β) corresponding to the HPA #β is access forbidden.

S430: Because the access rule for the memory space #β (or the HPA #β) indicated by the current target view (the indoor view) is access forbidden, the memory control unit 114 triggers a page exception. To be specific, the memory control unit 114 sends page exception information to the processing unit 112. For ease of understanding and distinguishing, the page exception information sent in S430 is denoted as page exception information #1.

S440: The processing unit 112 determines, based on the page exception information #1, that memory space that stores external code is accessed, or the processing unit 112 may determine that a currently running process (the process #α) (for example, a process that runs when the processing unit 112 receives the page exception information #1) invokes external code that needs to be monitored. As an example instead of a limitation, the processing unit 112 can determine the currently running process based on a CPU context.

In this case, the processing unit 112 monitors the process #α. Monitoring may be specifically implemented by using a VMM. Monitored content includes but is not limited to obtaining of context information of the process #α, a function name of the invoked external code, a parameter value transmitted when invoking occurs, a return value, and the like. Content and a process of monitoring on the process by the processing unit may be similar to those in the prior art. To avoid repetition, detailed descriptions thereof are omitted herein.

S450: At the moment #2, the processing unit 112 performs switching processing on the target view based on the page exception information #1. To distinguish the switching processing in S450 from that in another step, the switching processing in S450 is denoted as the switching processing #1 herein, and the switching processing #1 is used to switch the target view from the indoor view to the outdoor view.

In a period with a specific time length after the moment #2, for example, in a period (denoted as a period #b) between the moment #2 and a moment #3, a view used when the memory control unit 114 controls access to the memory 120 is the outdoor view. The moment #3 is a moment at which the processing unit 112 performs switching processing #2 on the target view.

S460: At a moment in the period #b (or a moment after the moment #2), the processing unit 112 resends the access request #1 to the memory control unit 114.

Correspondingly, the memory control unit 114 can receive the resent access request #1 at a moment in the period #b, and determine a current target view (the outdoor view).

S470: The memory control unit 114 searches the current target view (the outdoor view) for the HPA (that is, the HPA #β) corresponding to the guest physical address #β. Because an access rule for the memory space #β indicated by the current target view (the outdoor view) is access allowed, the memory control unit 114 controls, based on the access request #1, the processing unit 112 to access the memory space #β, for example, read and execute the external code stored in the memory space #β.

In this way, the process #α completes access to the memory space #β.

During execution of the external code stored in the memory space #β, the external code stored in the memory space #β may return data to the process α. In this case, the external code stored in the memory space #β indicates that the memory space #α needs to be accessed.

In this embodiment of this application, the external code performs returning after the process invokes the external code (at a moment in the foregoing period #b), and therefore, when the external code performs returning, a current target view is the outdoor view.

Figure 11:
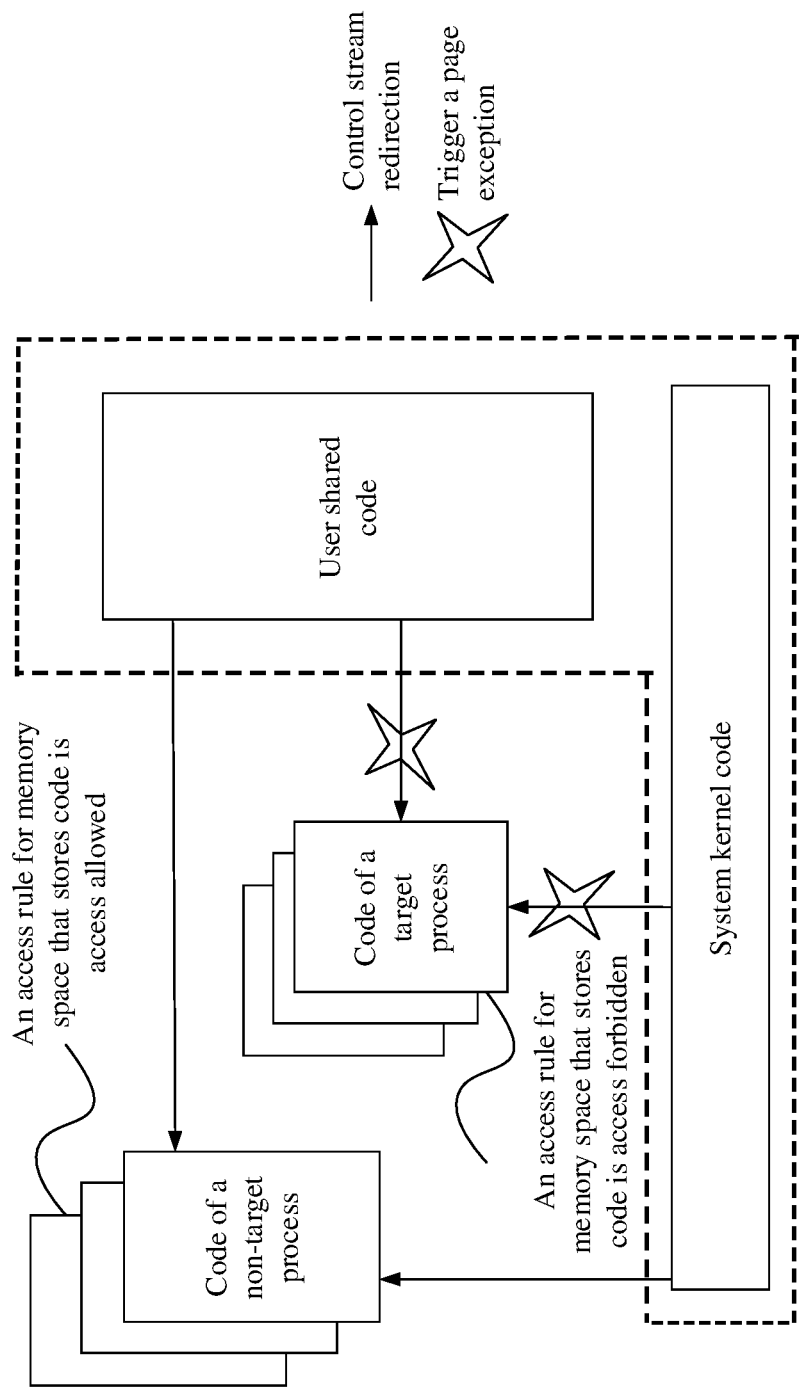
FIG. 11 is a schematic diagram of an example of an access rule recorded in an outdoor view for a physical address of storage space of internal code according to an embodiment of this application.

As shown in FIG. 11, in the embodiments of this application, an access rule for the memory space (for example, the memory space #α) used to store program code of the sample process in the outdoor view is set to access forbidden. In addition, although not shown in FIG. 11, an access rule for the memory space used to store the program code of the sample process in the indoor view is set to access allowed.

A processing procedure in which the process #α is a sample process is used as an example for description.

S480: After S470, at a moment in the period #b, the processing unit 112 executes code (for example, code of an external function) stored in the memory space #β and needs to access the memory space #α. For example, the code stored in the memory space #β indicates that a code execution result needs to be returned to the process #α. The processing unit 112 determines the GPA (that is, the GPA #α) of the memory space #α corresponding to the process #α, and sends an access request #2 to the memory control unit 114, where the access request #2 carries the GPA #α.

Correspondingly, the memory control unit 114 receives the access request #2, and the memory control unit 114 searches the current target view (the outdoor view) for the HPA (that is, the HPA #α) corresponding to the GPA #α. The memory control unit 114 determines, based on the current target view (the outdoor view), that an access rule for the memory space (that is, the memory space #α) corresponding to the HPA #α is access forbidden.

S490: Because the access rule for the memory space #α indicated by the current target view (the outdoor view) is access forbidden, the memory control unit 114 triggers a page exception. To be specific, the memory control unit 114 sends page exception information to the processing unit 112. For ease of understanding and distinguishing, the page exception information sent in S490 is denoted as page exception information #2.

S492: The processing unit 112 determines, based on the page exception information #2, that the external code needs to perform returning for a monitored process, or the processing unit 112 determines that returning for invoking the external code by the currently running process (that is, the process #α) is performed. As an example instead of a limitation, the processing unit 112 can determine the currently running process based on a CPU context. In this case, the processing unit 112 can monitor the process #α. For a meaning of the monitoring, refer to the descriptions in S440.

S494: At the moment #3, the processing unit 112 performs switching processing on a target view based on the page exception information #2. To distinguish the switching processing in S494 from that in another step, the switching processing in S494 herein is denoted as the switching processing #2, and the switching processing #2 is used to switch the target view from the outdoor view to the indoor view.

In a period with a specific time length after the moment #3, for example, in a period (denoted as a period #c) between the moment #3 and a moment at which the target view is switched next time, a view used when the memory control unit 114 controls access to the memory 120 is the indoor view.

S496: At a moment in the period #c, the processing unit 112 resends the access request #2 to the memory control unit 114.

Correspondingly, the memory control unit 114 receives the resent access request #2 in the period #c, and determines a current target view (the indoor view).

S498: The memory control unit 114 searches the current target view (the indoor view) for the HPA (that is, the HPA #α) corresponding to the guest physical address #α. Because the access rule for the memory space #α indicated by the current target view (the indoor view) is access allowed, the memory control unit 114 accesses the memory space #α based on the access request #2, for example, writes a processing result returned by the external code into the memory space #α, or returns the processing result to the process #α.

In this way, returning for invoking the external code is completed.

In addition, it should be noted that if the process #α is a non-sample process, an access rule corresponding to the HPA #α in the outdoor view is set to access allowed. Therefore, in the period #b, the memory control unit 114 may directly allow, based on the current target view (the outdoor view), the access request #2 to access the memory, and does not need to perform the foregoing switching processing #2.

According to the method provided in the embodiments of this application, when a GVA in the page table of the process of the sample program is assigned a GPA, and an access permission of the GPA is execution allowed, it is expected that code stored in memory space indicated by an HPA corresponding to the GPA may be code newly added to the process. Therefore, through monitoring on behavior of accessing the memory space indicated by the HPA, memory access or invoking for the newly added code of the sample process can be monitored, thereby improving computer security.

According to the method provided in the embodiments of this application, the processing unit may configure the first view (for example, the indoor view) and the second view (for example, the outdoor view); mapping relationships between the target GPA and the target HPA indicated separately by the first view and the second view are the same; access rules for the target GPA indicated separately by the first view and the second view are different. An access rule for memory space used to store external code in the first view is access forbidden, and an access rule for memory space used to store internal code in the first view is access allowed. The access rule for the memory space used to store external code in the second view is access allowed, and the access rule for the memory space used to store internal code in the second view is access forbidden.

When a process starts to run, the processing unit sets the first view as a target view used when the memory control unit controls access to the memory. When the process needs to invoke external code, the memory control unit reports page exception information to the processing unit because an access rule for memory space used to store external code in the target view (the first view) is access forbidden. The processing unit can trigger monitoring on the sample process based on the page exception information, switch the target view from the first view to the second view, and resend the access request. Because the access rule for the memory space used to store the external code in the target view (the second view) after switching is access allowed, the memory control unit can allow the access. Therefore, when the code stored in the target GPA is external code, invoking of the external code by the sample process can be monitored.

During the running of the external code by the process, the target view is the second view. Therefore, when the process needs to return from the external code, the memory control unit reports page exception information to the processing unit because an access rule for memory space used to store internal code in the target view (the second view) is access forbidden. The processing unit can trigger monitoring on the process based on the page exception information, switch the target view from the second view to the first view, and resend the access request. Because the target view (the first view) after switching indicates that the access rule for the memory space used to store the internal code is access allowed, the memory control unit can allow the access. Behavior of returning for the invoking can be monitored without affecting access of the process to the memory, and a monitoring occasion is added on the basis of monitoring on invoking of an external function by the process. Therefore, when the code stored in the target GPA is internal code, invoking of the internal code by the sample process can be monitored.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
    determining, by a processor of a computer, a page table of a sample process based on a page directory base address of the sample process, wherein the sample process is generated after a monitored sample program runs, the page table of the sample process comprises a plurality of entries, the plurality of entries are in a one-to-one correspondence to a plurality of guest virtual addresses, each entry of the plurality of entries comprises first information, the respective first information of each entry indicates whether the guest virtual address corresponding to the respective entry has been assigned a guest physical address, and wherein, for each entry in which the first information of the respective entry indicates that the guest virtual address corresponding to the respective entry has been assigned the guest physical address, the respective entry further comprises second information, the second information indicating an access permission of the corresponding assigned guest physical address;
    determining, by the processor, a target entry from the page table of the sample process by determining an entry of the plurality of entries for which a value of the first information of the determined entry indicates that the guest virtual address corresponding to the determined entry has been assigned the guest physical address and for which the access permission indicated by the second information of the determined entry is execution allowed;
    determining, by the processor, a target guest physical address based on the target entry, wherein the target guest physical address is the guest physical address that has been assigned to the guest virtual address corresponding to the target entry;
    determining, by the processor, a target host physical address corresponding to the target guest physical address;
    monitoring, by the processor, behavior of accessing a memory space indicated by the target host physical address, wherein the memory space is of a memory comprised in the computer;
    wherein monitoring behavior of accessing the memory space indicated by the target host physical address comprises:
    separately recording, by the processor, a mapping relationship between the target guest physical address and the target host physical address in a first view and a second view, wherein an access rule recorded in the first view for a memory space that is indicated by the host physical address and used to store external code is access forbidden, an access rule recorded in the first view for a memory space that is indicated by the host physical address and used to store internal code is access allowed, an access rule recorded in the second view for a memory space that is indicated by the host physical address and used to store external code is access allowed, and an access rule recorded in the second view for a memory space that is indicated by the host physical address and used to store internal code is access forbidden;
    determining, by the processor, whether target code stored in a memory space indicated by the target host physical address is external code or internal code;
    when the target code is external code, setting, by the processor, an access rule for the target host physical address in the first view to access forbidden, and setting an access rule for the target host physical address in the second view to access allowed;
    when the target code is internal code, setting, by the processor, the access rule for the target host physical address in the first view to access allowed, and setting the access rule for the target host physical address in the second view to access forbidden;
    receiving, by the processor, exception information sent by a memory controller, wherein the exception information is sent when an access rule for the target host physical address in a target view is access forbidden when the memory controller receives a memory access request for the target host physical address, the target view is a view used by the memory controller to control the access to the target host physical address, and the target view is one of the first view or the second view; and
    monitoring, by the processor based on the exception information, the sample process that generates the memory access request, and controlling the memory controller to switch the target view between the first view and the second view.

2. The method according to claim 1, wherein determining, by the processor, whether the target code stored in the memory space indicated by the target host physical address is external code or internal code comprises:
    determining, by the processor, a target guest virtual address corresponding to the target guest physical address based on a page table of the sample process;
    determining, by the processor, a virtual address range to which the target guest virtual address belongs from a virtual address descriptor (VAD); and
    determining, by the processor, whether the target code is external code or internal code based on a code segment name corresponding to the virtual address range recorded in the VAD.

3. The method according to claim 2, wherein each entry of the plurality of entries comprises 64 bits, wherein, for each entry of the plurality of entries, the first information of the respective entry comprises one bit, the first information of the respective entry occupies a 0th bit among the 64 bits, and when the respective entry comprises the second information, the second information of the respective entry comprises one bit, and the second information of the respective entry occupies a 63rd bit among the 64 bits.

4. The method according to claim 1, wherein determining, by the processor, whether the target code stored in the memory space indicated by the target host physical address is external code or internal code comprises:
    determining, by the processor, a target guest virtual address corresponding to the target guest physical address based on a page table of the sample process;
    determining, by the processor, a virtual memory area to which the target guest virtual address belongs; and determining, by the processor, whether the target code is external code or internal code based on a type of code stored in the virtual memory area.

5. The method according to claim 1, wherein each entry of the plurality of entries comprises 64 bits, and wherein, for each entry of the plurality of entries, the first information of the respective entry comprises one bit, the first information of the respective entry occupies a 0th bit among the 64 bits, and when the respective entry comprises the second information, the second information of the respective entry comprises one bit, and the second information of the respective entry occupies a 63rd bit among the 64 bits.

6. The method according to claim 1, wherein the external code is global code shared by all processes, and wherein the internal code is code of the monitored sample program that generates the sample process, the internal code belongs to the sample process, and the internal code is not shared with another process.

7. An apparatus, comprising:
a memory, configured to provide memory space;
a processor; and
a memory controller, configured to control access of the processor to the memory space based on an access request sent by the processor; and
wherein the processor is configured to:
determine a page table of a sample process based on a page directory base address of the sample process, wherein the sample process is a process generated after a monitored sample program runs, the page table of the sample process comprises a plurality of entries, the plurality of entries are in one-to-one correspondence to a plurality of guest virtual addresses, each entry of the plurality of entries comprises first information, the first information of each entry of the plurality of entries indicates whether the guest virtual address corresponding to the respective entry has been assigned a guest physical address, and wherein, for each entry in which the first information of the respective entry indicates that the guest virtual address corresponding to the respective entry has been assigned the guest physical address, the respective entry further comprises second information, the second information indicating an access permission of the corresponding assigned guest physical address;
determine a target entry from the page table of the sample process by determining an entry of the plurality of entries for which a value of the first information of the determined entry indicates that the guest virtual address corresponding to the determined entry has been assigned the guest physical address and for which the access permission indicated by second information of the determined entry is execution allowed;
determine a target guest physical address based on the target entry, wherein the target guest physical address is the guest physical address that has been assigned to the guest virtual address corresponding to the target entry;
determine a target host physical address corresponding to the target guest physical address;
monitor behavior of accessing a first memory space indicated by the target host physical address;
separately record a mapping relationship between the target guest physical address and the target host physical address in a first view and a second view, wherein an access rule recorded in the first view for a memory space that is indicated by the host physical address and used to store external code is access forbidden, an access rule recorded in the first view for a memory space that is indicated by the host physical address and used to store internal code is access allowed, an access rule recorded in the second view for a memory space that is indicated by the host physical address and used to store external code is access allowed, and an access rule recorded in the second view for a memory space that is indicated by the host physical address and used to store internal code is access forbidden;
determine whether target code stored in the first memory space indicated by the target host physical address is external code or internal code;
when the target code is external code, set an access rule for the target host physical address in the first view to access forbidden, and set an access rule for the target host physical address in the second view to access allowed; and
when the target code is internal code, set the access rule for the target host physical address in the first view to access allowed, and set the access rule for the target host physical address in the second view to access forbidden;
wherein the memory controller is configured to: when receiving a memory access request for the target host physical address, and an access rule recorded in a target view is access forbidden, send exception information, wherein the target view is a view used when the memory controller controls the access to the target host physical address, and the target view is one of the first view or the second view; and
wherein the processor being configured to monitor behavior of accessing the first memory space indicated by the target host physical address comprises the processor being configured to: monitor, based on the exception information, the sample process that generates the memory access request, and control the memory controller to switch the target view between the first view and the second view.

8. The apparatus according to claim 7, wherein the processor is configured to:
determine a target guest virtual address indicated by the target guest physical address based on a page table of the sample process;
determine a virtual address range to which the target guest virtual address belongs from a virtual address descriptor (VAD); and
determine whether the target code is external code or internal code based on a code segment name corresponding to the virtual address range recorded in the VAD.

9. The apparatus according to claim 8, wherein each entry of the plurality of entries comprises 64 bits, and wherein, for each entry of the plurality of entries, the first information of the respective entry comprises one bit, the first information of the respective entry occupies a 0th bit among the 64 bits, and when the respective entry comprises the second information, the second information of the respective entry comprises one bit, and the second information in the respective entry occupies a 63rd bit among the 64 bits.

10. The apparatus according to claim 7, wherein the processor is configured to:
determine a target guest virtual address corresponding to the target guest physical address based on a page table of the sample process;

determine a virtual memory area to which the target guest virtual address belongs; and determine whether the target code is external code or internal code based on a type of code stored in the virtual memory area.

11. The apparatus according to claim 7, wherein each entry of the plurality of entries comprises 64 bits, and wherein, for each entry of the plurality of entries, the first information of the respective entry comprises one bit, the first information of the respective entry occupies a 0th bit among the 64 bits, and when the respective entry comprises the second information, the second information of the respective entry comprises one bit, and the second information of the respective entry occupies a 63rd bit among the 64 bits.

12. The apparatus according to claim 7, wherein the external code is global code shared by all processes, and wherein the internal code is code of the monitored sample program that generates the sample process, the internal code belongs to the sample process, and the internal code is not shared with another process.

13. A computer chip, comprising:
at least one processor, configured to perform the following operations:
determining a page table of a sample process based on a page directory base address of the sample process, wherein the sample process is generated after a monitored sample program runs, the page table of the sample process comprises a plurality of entries, the plurality of entries are in one-to-one correspondence to a plurality of guest virtual addresses, each entry of the plurality of entries comprises first information, the first information of each entry indicates whether the guest virtual address corresponding to the respective entry has been assigned a guest physical address, and wherein, for each entry in which the first information of the respective entry indicates that the guest virtual address corresponding to the respective entry has been assigned the guest physical address, the respective entry further comprises second information, the second information indicating an access permission of the corresponding assigned guest physical address;
determining a target entry from the page table of the sample process by determining an entry of the plurality of entries for which a value of the first information of the determined entry indicates that the guest virtual address corresponding to the determined entry has been assigned the guest physical address and the access permission indicated by the second information of the determined entry is execution allowed;
determining a target guest physical address based on the target entry, wherein the target guest physical address is the guest physical address that has been assigned to the guest virtual address corresponding to the target entry;
determining a target host physical address corresponding to the target guest physical address;
monitoring behavior of accessing a memory space indicated by the target host physical address; and
wherein monitoring behavior of accessing the memory space indicated by the target host physical address comprises:
separately recording a mapping relationship the target guest physical address and the target host physical address in a first view and a second view, wherein an access rule recorded in the first view for a memory space that is indicated by the host physical address and used to store external code is access forbidden, an access rule recorded in the first view for a memory space that is indicated by the host physical address and used to store internal code is access allowed, an access rule recorded in the second view for a memory space that is indicated by the host physical address and used to store external code is access allowed, and an access rule recorded in the second view for a memory space that is indicated by the host physical address and used to store internal code is access forbidden;
determining whether target code stored in the memory space indicated by the target host physical address is external code or internal code;
when the target code is external code, setting an access rule for the target host physical address in the first view to access forbidden, and setting an access rule for the target host physical address in the second view to access allowed;
when the target code is internal code, setting the access rule for the target host physical address in the first view to access allowed, and setting the access rule for the target host physical address in the second view to access forbidden;
receiving exception information sent by a memory controller, wherein the exception information is sent when the access rule for the target host physical address in the target view is access forbidden when the memory controller receives a memory access request for the target host physical address, the target view is used by the memory controller to control the access to the target host physical address, and the target view is one of the first view or the second view; and
monitoring, based on the exception information, the sample process that generates the memory access request, and controlling the memory controller to switch the target view between the first view and the second view.

14. The computer chip according to claim 13, wherein the at least one processor is further configured to perform the following operations:
determining a target guest virtual address corresponding to the target guest physical address based on a page table of the sample process;
determining a virtual address range to which the target guest virtual address belongs from a virtual address descriptor (VAD); and
determining whether the target code is external code or internal code based on a code segment name corresponding to the virtual address range recorded in the VAD.

15. The computer chip according to claim 13, wherein the external code is global code shared by all processes, and wherein the internal code is code of the monitored sample program that generates the sample process, the internal code belongs to the sample process, and the internal code is not shared with another process.

16. A non-transitory computer-readable storage medium, comprising a computer program, wherein when the computer program runs on a computer device, a processor comprised in the computer device is caused to perform the following operations:
determining a page table of a sample process based on a page directory base address of the sample process, wherein the sample process is a process generated after a monitored sample program runs, the page table of the sample process comprises a plurality of entries, the plurality of entries are in one-to-one correspondence to a plurality of guest virtual addresses, each entry of the plurality of entries comprises first information, the first information of each entry indicates whether the guest virtual address corresponding to the respective entry has been assigned a guest physical address, and wherein, for each entry in which the first information of the respective entry indicates that the guest virtual address corresponding to the respective entry has been assigned the guest physical address, the respective entry further comprises second information, the second information indicating an access permission of the assigned guest physical address;

determining a target entry from the page table of the sample process by determining an entry of the plurality of entries for which a value of the first information of the determined entry indicates that the guest virtual address corresponding to the determined entry has been assigned the guest physical address and for which the access permission indicated by the second information of the target entry is execution allowed;

determining a target guest physical address based on the target entry, wherein the target guest physical address is the guest physical address that has been assigned to the guest virtual address corresponding to the target entry;

determining a target host physical address corresponding to the target guest physical address;

monitoring behavior of accessing memory space indicated by the target host physical address; and wherein monitoring behavior of accessing the memory space indicated by the target host physical address comprises:
  separately recording a mapping relationship between the target guest physical address and the target host physical address in a first view and a second view, wherein an access rule recorded in the first view for a memory space that is indicated by the host physical address and used to store external code is access forbidden, an access rule recorded in the first view for a memory space that is indicated by the host physical address and used to store internal code is access allowed, an access rule recorded in the second view for a memory space that is indicated by the host physical address and used to store external code is access allowed, and an access rule recorded in the second view for a memory space that is indicated by the host physical address and used to store internal code is access forbidden;
  determining whether target code stored in the memory space indicated by the target host physical address is external code or internal code;
  when the target code is external code, setting an access rule for the target host physical address in the first view to access forbidden, and setting an access rule for the target host physical address in the second view to access allowed;
  when the target code is internal code, setting the access rule for the target host physical address in the first view to access allowed, and setting the access rule for the target host physical address in the second view to access forbidden;
  receiving exception information sent by a memory controller, wherein the exception information is sent when the access rule for the target host physical address in the target view is access forbidden when the memory controller receives a memory access request for the target host physical address, the target view is used by the memory controller to control the access to the target host physical address, and the target view is one of the first view or the second view; and
  monitoring, based on the exception information, the sample process that generates the memory access request, and controlling the memory controller to switch the target view between the first view and the second view.

17. The computer-readable storage medium according to claim 16, wherein the external code is global code shared by all processes, and wherein the internal code is code of the monitored sample program that generates the sample process, the internal code belongs to the sample process, and the internal code is not shared with another process.

18. The computer-readable storage medium according to claim 16, wherein determining whether the target code stored in the memory space indicated by the target host physical address is external code or internal code comprises:
  determining a target guest virtual address corresponding to the target guest physical address based on a page table of the sample process;
  determining a virtual address range to which the target guest virtual address belongs from a virtual address descriptor (VAD); and
  determining whether the target code is external code or internal code based on a code segment name corresponding to the virtual address range recorded in the VAD.

19. The computer-readable storage medium according to claim 16, wherein each entry of the plurality of entries comprises 64 bits, wherein, for each entry of the plurality of entries, the first information of the respective entry comprises one bit, the first information of the respective entry occupies a 0th bit among the 64 bits, and when the respective entry comprises the second information, the second information of the respective entry comprises one bit, and the second information of the respective entry occupies a 63rd bit among the 64 bits.

20. The computer-readable storage medium according to claim 16, wherein determining whether the target code stored in the memory space indicated by the target host physical address is external code or internal code comprises:
  determining a target guest virtual address corresponding to the target guest physical address based on a page table of the sample process;
  determining a virtual memory area to which the target guest virtual address belongs; and
  determining whether the target code is external code or internal code based on a type of code stored in the virtual memory area.

* * * * *

UNITED STATES PATENT AND TRADEMARK OFFICE
CERTIFICATE OF CORRECTION

PATENT NO. : 11,467,977 B2
APPLICATION NO. : 17/128751
DATED : October 11, 2022
INVENTOR(S) : Jinfeng Yuan et al.

It is certified that error appears in the above-identified patent and that said Letters Patent is hereby corrected as shown below:

In the Claims

Claim 13, Column 41, Line 65; insert --between-- after "relationship".

Signed and Sealed this
Twenty-second Day of November, 2022

Katherine Kelly Vidal
*Director of the United States Patent and Trademark Office*